US010261782B2

(12) United States Patent
Suarez et al.

(10) Patent No.: US 10,261,782 B2
(45) Date of Patent: Apr. 16, 2019

(54) SOFTWARE CONTAINER REGISTRY SERVICE

(71) Applicant: Amazon Technologies, Inc., Seattle, WA (US)

(72) Inventors: Anthony Joseph Suarez, Seattle, WA (US); Scott Kerns Windsor, Seattle, WA (US); Nare Hayrapetyan, Seattle, WA (US); Daniel Robert Gerdesmeier, Seattle, WA (US); Pooja Kalpana Prakash, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 18 days.

(21) Appl. No.: 14/975,631

(22) Filed: Dec. 18, 2015

(65) Prior Publication Data
US 2017/0180346 A1 Jun. 22, 2017

(51) Int. Cl.
H04L 29/06 (2006.01)
G06F 8/71 (2018.01)
(Continued)

(52) U.S. Cl.
CPC .................. *G06F 8/71* (2013.01); *G06F 8/63* (2013.01); *G06F 9/45558* (2013.01);
(Continued)

(58) Field of Classification Search
CPC ..... H04L 47/70; H04L 12/4641; H04L 67/34; H04L 41/0896; H04L 63/083; G06F 8/63;
(Continued)

(56) References Cited

U.S. PATENT DOCUMENTS 7,805,706 B1 9/2010 Ly
8,468,244 B2 6/2013 Redlich et al.
(Continued)

FOREIGN PATENT DOCUMENTS

WO 2014047073 A1 3/2014
WO 2015164521 A1 10/2015

OTHER PUBLICATIONS

He et al., "Elastic Application Container: A Lightweight Approach for Cloud Resource Provisioning," 26th IEEE International Conference on Advanced Information Networking and Applications, Mar. 26, 2012, pp. 15-22.
(Continued)

*Primary Examiner* — Don G Zhao
(74) *Attorney, Agent, or Firm* — Davis Wright Tremaine LLP

(57) ABSTRACT

A request to store, in first data store associated with a customer of a computing resource service provider, a software image is received, the request including a set of layers of the software image to be stored. As a result of successful authentication of the request, based at least in part on a security token included with the request, a subset of layers of the software image that have not previously been stored in the first data store are determined, based at least in part on first metadata obtained from a second data store, the subset of layers in the first data store are stored, second metadata about the subset of layers are stored in the second data store, and the software image is caused to be launched in a software container of an instance based at least in part on the subset of layers.

20 Claims, 17 Drawing Sheets

(51) Int. Cl.
  *G06F 9/455* (2018.01)
  *G06F 21/53* (2013.01)
  *G06F 8/61* (2018.01)
  *G06F 21/62* (2013.01)

(52) U.S. Cl.
  CPC .......... *G06F 21/53* (2013.01); *G06F 21/6209* (2013.01); *G06F 2009/4557* (2013.01); *G06F 2221/033* (2013.01)

(58) Field of Classification Search
  CPC ....... G06F 9/45558; G06F 2009/45562; G06F 21/53; G06F 8/71; G06F 9/445; G06F 2009/4557; G06F 2221/033
  See application file for complete search history.

(56) References Cited

U.S. PATENT DOCUMENTS

| | | | |
|---|---|---|---|
| 8,621,069 | B1 | 12/2013 | Tompkins |
| 8,788,855 | B2 | 7/2014 | Cong |
| 9,203,613 | B2 | 12/2015 | Roth |
| 9,256,467 | B1 | 2/2016 | Singh |
| 9,275,408 | B1 * | 3/2016 | King .................. G06F 21/33 |
| 2001/0015691 | A1 | 8/2001 | Mellen et al. |
| 2004/0040025 | A1 | 2/2004 | Lehtinen |
| 2005/0096025 | A1 * | 5/2005 | Qumei .................. G06F 8/65 455/418 |
| 2005/0257266 | A1 | 11/2005 | Cook et al. |
| 2006/0106889 | A1 * | 5/2006 | Mannby .................. G06F 8/71 |
| 2006/0136928 | A1 | 6/2006 | Crawford, Jr. |
| 2006/0168575 | A1 | 7/2006 | Bhatt et al. |
| 2006/0168581 | A1 | 7/2006 | Goger et al. |
| 2007/0118657 | A1 | 5/2007 | Kreitzer |
| 2007/0150886 | A1 | 6/2007 | Shapiro |
| 2007/0245331 | A1 | 10/2007 | Daynes et al. |
| 2007/0282951 | A1 | 12/2007 | Selimis et al. |
| 2008/0201701 | A1 * | 8/2008 | Hofhansl .................. G06F 8/60 717/168 |
| 2009/0323941 | A1 | 12/2009 | Sahita et al. |
| 2010/0153941 | A1 | 6/2010 | Borissov et al. |
| 2012/0173866 | A1 * | 7/2012 | Ashok .................. G06F 21/575 713/150 |
| 2013/0191527 | A1 | 7/2013 | Ashok et al. |
| 2013/0262638 | A1 * | 10/2013 | Kumarasamy ........ G06F 15/177 709/221 |
| 2013/0268740 | A1 | 10/2013 | Holt |
| 2013/0297964 | A1 | 11/2013 | Hegdal et al. |
| 2013/0311613 | A1 | 11/2013 | Aleksandrov et al. |
| 2014/0149986 | A1 | 5/2014 | S M et al. |
| 2014/0222949 | A1 * | 8/2014 | Barton ................ H04L 67/1097 709/216 |
| 2015/0134661 | A1 | 5/2015 | Circlaeys et al. |
| 2015/0161194 | A1 * | 6/2015 | Provenzano ...... G06F 17/30371 707/690 |
| 2015/0263983 | A1 | 9/2015 | Brennan et al. |
| 2015/0281111 | A1 | 10/2015 | Carl |
| 2016/0099963 | A1 | 4/2016 | Mahaffey et al. |
| 2016/0112521 | A1 | 4/2016 | Lawson et al. |
| 2016/0162320 | A1 | 6/2016 | Singh et al. |
| 2016/0162336 | A1 | 6/2016 | Zheng et al. |
| 2016/0164762 | A1 | 6/2016 | Reque et al. |
| 2016/0205518 | A1 | 7/2016 | Patel et al. |
| 2016/0239799 | A1 | 8/2016 | Burch et al. |
| 2016/0335454 | A1 | 11/2016 | Choe et al. |
| 2016/0366104 | A1 | 12/2016 | Goldberg et al. |
| 2016/0378517 | A1 | 12/2016 | Zellermayer et al. |
| 2017/0063722 | A1 | 3/2017 | Cropper et al. |
| 2017/0109186 | A1 * | 4/2017 | Figueroa ............. G06F 9/45558 |

OTHER PUBLICATIONS

International Search Report and Written Opinion dated Feb. 4, 2016, International Patent Application No. PCT/US2015/059983, 12 pages.
International Search Report and Written Opinion dated May 4, 2017, International Patent Application No. PCT/US2016/067292, filed Dec. 16, 2016.
Van et al., "SLA-aware Virtual Resource Management for Cloud Infrastructures," IEEE Ninth International Conference on Computer and Information Technology, Oct. 11, 2009, pp. 357-362.
Soltesz, S., et al., "Container-Based Operating System Virtualization: A Scalable, High-Performance Alternative to Hypervisors," Proceedings of the 2nd ACM SIGOPS/EuroSys European Conference on Computer Systems, Mar. 21-23, 2007, Lisbon, Portugal, ACM SIGOPS Operating Systems Review 41(3):275-287.
Xavier, M.G., et al., "Performance Evaluation of Container-Based Virtualization for High Performance Computing Environments," 2013 21st Euromicro International Conference on Parallel, Distributed, and Network-Based Processing, Feb. 2013, pp. 233-240.
Zhao, M., and R.J. Figueiredo, "Experimental Study of Virtual Machine Migration in Support of Reservation of Resources," In Proceedings of the 2nd International Workshop on Virtualization Technology in Distributed Computing, Nov. 12, 2007, Reno, Nevada, pp. 1-8.
Roth, G.B., et al., "Techniques for Client Constructed Sessions," U.S. Appl. No. 13/248,953, filed Sep. 29, 2011, now U.S. Pat. No. 9,203,613.
Singh, D., et al., "System for Managing and Scheduling Containers," U.S. Appl. No. 14/538,663, filed Nov. 11, 2014, now U.S. Pat. No. 9,256,467.
Pikkarainen et al., "The impact of agile practices on communication in software development," Empirical Software Engineering 13(3):303-37, Jun. 1, 2008.
Ramamritham, "Allocation and scheduling of precedence-related periodic tasks," IEEE Transactions on Parallel and Distributed Systems 6(4):412-420, Apr. 1995.
Thiele et al., "Embedded Software in Network Processors—Models and Algorithms," Lecture Notes in Computer Science 2211:416-34, Oct. 8, 2001.

* cited by examiner

SOFTWARE CONTAINER REGISTRY SERVICE

CROSS REFERENCE TO RELATED APPLICATION

This application incorporates by reference for all purposes the full disclosure of co-pending U.S. patent application Ser. No. 14/975,627, filed concurrently herewith, entitled "SOFTWARE CONTAINER REGISTRY CONTAINER IMAGE DEPLOYMENT" and co-pending U.S. patent application Ser. No. 14/975,637, filed concurrently herewith, entitled "SOFTWARE CONTAINER REGISTRY INSPECTION."

BACKGROUND

Software containers can allow multiple applications to quickly launch and run within the respective user spaces without overhead associated with starting and maintaining separate virtual machines. Companies and individuals have turned to these software containers for automated application deployment on virtual machine instances being remotely hosted by distributed computing systems of computing resource service providers. However, revision control and source file management for containerized software images is limited, does not guard against security vulnerabilities, and does not make efficient use of storage resources.

BRIEF DESCRIPTION OF THE DRAWINGS

Various embodiments in accordance with the present disclosure will be described with reference to the drawings, in which.

DETAILED DESCRIPTION

Figure 1:
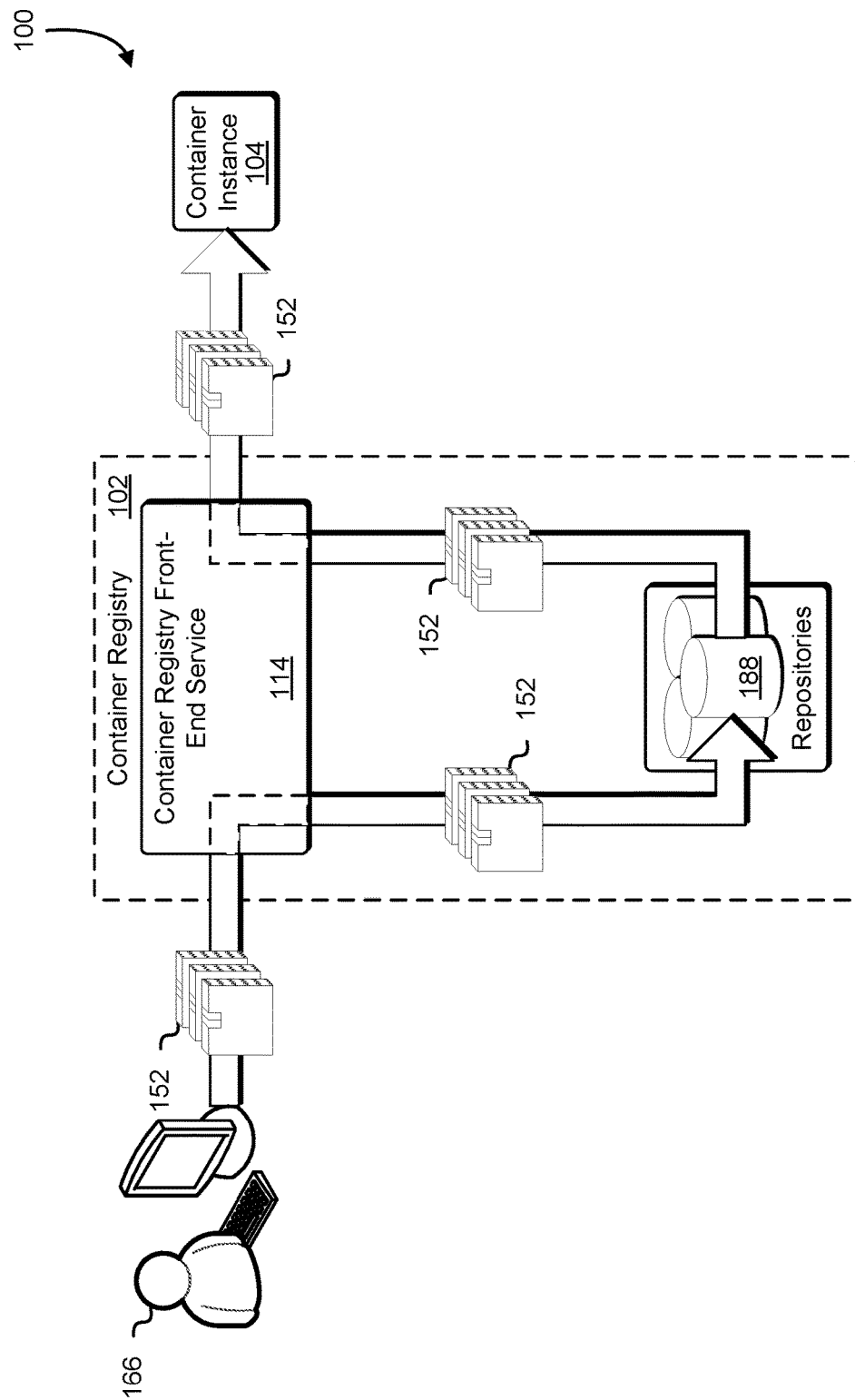
FIG. 1 illustrates an example of a container registry in accordance with an embodiment.

In one example, a system including a container registry comprising one or more repositories may receive a first application programming interface request to store a container image in a repository of a customer of a computing resource service provider. In response to receiving the first request, the system may determine a set of container image layers that comprise the container image specified by the first request. The system may also obtain or generate a manifest that contains metadata about the set of container image layers corresponding to the specified container image. Individual container image layers may comprise a set of files of the container image. The system may determine a subset of the set of container image layers that have not yet been stored in the repository of the customer, and store the manifest and the subset in the repository as a stored container image.

Subsequently, the system may receive a second application programming interface request to launch the stored container image in a container instance of the customer as a running software container. In response to receiving the second request, the system may obtain the manifest corresponding to stored container image, and retrieve the set of files for the stored container image as indicated by the manifest. As a result of retrieving the set of files of the layers comprising the container image, the system may cause the container image to be launched as the running software container in the container instance of the customer.

In another example, the system further comprises a front-end service that provides a plurality of application programming interfaces for performing operations with the container registry. In this example, the customer may make, using a computing device, a request, using an application programming interface provided by the front-end service, to store the specified container image in the container registry. In response to the customer making the request, the system may make the aforementioned first programming interface request to the container registry, thereby causing the container image to be stored in the container registry. Also in this example, the customer may make, using the computing device, another request, using an application programming interface provided by the front-end service, a request to launch the specified container image in a container instance of the customer. In response to the customer making the other request, the system may make the aforementioned second programming interface request to the container registry, thereby causing the specified container image to be launched in the container instance.

In the preceding and following description, various techniques are described. For purposes of explanation, specific configurations and details are set forth in order to provide a thorough understanding of possible ways of implementing the techniques. However, it will also be apparent that the techniques described may be practiced in different configurations without the specific details. Furthermore, well-known features may be omitted or simplified to avoid obscuring the techniques being described.

Techniques described and suggested in the present disclosure improve the field of computing, specifically the field of revision control systems, by providing a service for revision control of container images configured to run as software containers. Additionally, techniques described and suggested in the present disclosure improve the efficiency of computing systems by storing container images as layers, which allows efficient use of storage resources. Moreover, techniques described and suggested in the present disclosure are necessarily rooted in computer technology in order to overcome problems specifically arising with software containers by providing tools for scanning for security vulnerabilities and licensing compliance issues, and tools for auto deployment of software.

FIG. 1 illustrates an aspect of an environment 100 in which an embodiment may be practiced. As illustrated in FIG. 1, the environment 100 may include a customer 166 who has built a container image 152 configured to run in a container instance 104. The customer 166 may upload the container image 152 to a container registry 102 through a container registry front-end service 114. From the container registry 102, the container image 152 may be served to the container instance 104 through the container registry front-end service 114 to be launched. In some examples, a "container image" may refer to metadata and one or more computer files corresponding to contents and/or structure of one or more software applications configured to execute in a software container. In some cases, the container image 152 may comprise "layers" that correspond to steps in the build process of the container image 152. The container image 152 may be new software (e.g., a first version) or may be an update to one or more components of the previous version of the container image 152. The customer 166 may be a customer of a computing resource service provider that is hosting container instances for the customer 166. The customer 166 may wish to store the container image 152 in a repository for various reasons. For example, the customer 166 may wish to have revision control over the container image 152 and be able to roll back to previous versions or install previous versions of the container image 152. As another example, the customer 166 may be a software vendor and wish to upload the container image to a publicly-accessible repository in order to make it accessible to other users for download and/or purchase.

The container image 152 may be one or more software applications corresponding to a software package. The container image 152, as is further described below, may be uploaded and stored as a set of layers. That is, each layer of the container image 152 may correspond to a step in the build process of the container image 152 as a whole. One or more base layers of the container image 152 may comprise the operating system used to execute other software applications. If the container image 152 is an update to a container image already stored in the container registry 102, not all layers of the container image 152 need to be uploaded to the container registry; that is, only the layers of the container image 152 may need to be uploaded, and, in this way, container registry 102 storage is optimized and bandwidth needed for uploading container images may be reduced.

The primary responsibility of the container registry front-end service 114 may be to provide external application programming interfaces for customers of the computing resource service provider to be able to manage images stored in their container registry (e.g., the container registry 102).

Examples of application programming interfaces provided by the container registry front-end service 114 may include:

| API | Description | Queries Registry Metadata Service |
|---|---|---|
| GetAuthorizationToken( ) | Upon confirmation that the requesting entity is authorized, obtains a security token usable to obtain access to a specified registry | |
| UpdateRegistry( ) | Modifies metadata about a specified registry | |
| CreateRegistry( ) | Creates a registry for the requesting entity | Yes |
| DeleteRegistry( ) | Deletes a specified registry of the requesting entity | Yes |
| DescribeRegistries( ) | Returns metadata about a specified registry | Yes |
| ListImages( ) | Returns a list of container images stored in a specified registry | Yes |
| DescribeImages( ) | Returns metadata about a specified image | Yes |
| UpdateImage( ) | Uploads one or more updated image layers for a specified image | Yes |
| DeleteImage( ) | Deletes a specified image | Yes |
| GetLayerDownloadUrl( ) | Returns the location from where a layer can be downloaded from the repository | |
| GetLayerUploadUrl( ) | Returns the location to where a layer can be uploaded to the repository | |
| ListTags( ) | Returns a list of tags for images in the repository; tags being used to associate container images with each other as a group (e.g., "version 1," "version 2," etc.) | Yes |
| SearchRepositories( ) | Allows searching of repositories for files or container images | Yes |

The container registry 102 may be a comprised of one or more repositories configured to store files and/or directories corresponding to container images, such as the container image 152, and metadata for the files and/or directories. Individual repositories 188 may be assigned to customers of the computing resource service provider. Customers may have one or more repositories 188 as needed. For example, a customer may have a private repository to which the customer uploads container images under development, but not yet ready for release, and a public repository to upload container images that may be purchased and/or downloaded for installation by various users or other customers of the computing resource service provider. The repositories may be individual databases or may be stored in one or more data stores of a data storage service of the computing resource service provider. Each repository may have various associated roles and policies specifying access types and restricting access to the repository to entities authorized by the customer to access the repository.

In some examples, a "container instance" (also referred to as "software container instance") may refer to a computer system instance (virtual or non-virtual, such as a physical computer system running an operating system) that is configured to launch and run software containers. The container instance 104 may be configured to run software containers in accordance with the task definition file provided by a customer of the computing resource service provider. One or more container instances may comprise a cluster. In some examples, "cluster" may refer to a set of one or more container instances that have been registered to (i.e., as being associated with) the cluster. Thus, the container instance 104 may be one of many different container instances registered to a particular cluster.

A "software container" (also referred to as a "container" for short) may be an isolated user space instance. That is, a software container may be a lightweight virtualization instance running under a computer system instance that includes programs, data, and system libraries. When the software container is run, the running program (i.e., the process) is isolated from other processes running in the same computer system instance. Thus, multiple software containers may each run on an operating system (e.g., using memory, CPU, and storage allocated by the operating system) of the container instance 104 and execute in isolation from each other (e.g., each container may have an isolated view of the file system of the operating system). Each of the containers may have its own namespace, and applications running within the containers may be isolated by only having access to resources available to the container namespace. In this manner, containers may be an effective way to run one or more single applications within their own namespace without overhead associated with starting and maintaining virtual machines for running separate user space instances. Examples of systems for managing software containers include the Docker container engine and the CoreOS Rocket container engine. Software containers may be launched to have only specified resources from resources allocated to the container instance 104; that is, a task definition may specify that a software container only utilize a specified amount of memory and/or a specified amount of processing power.

Figure 2:
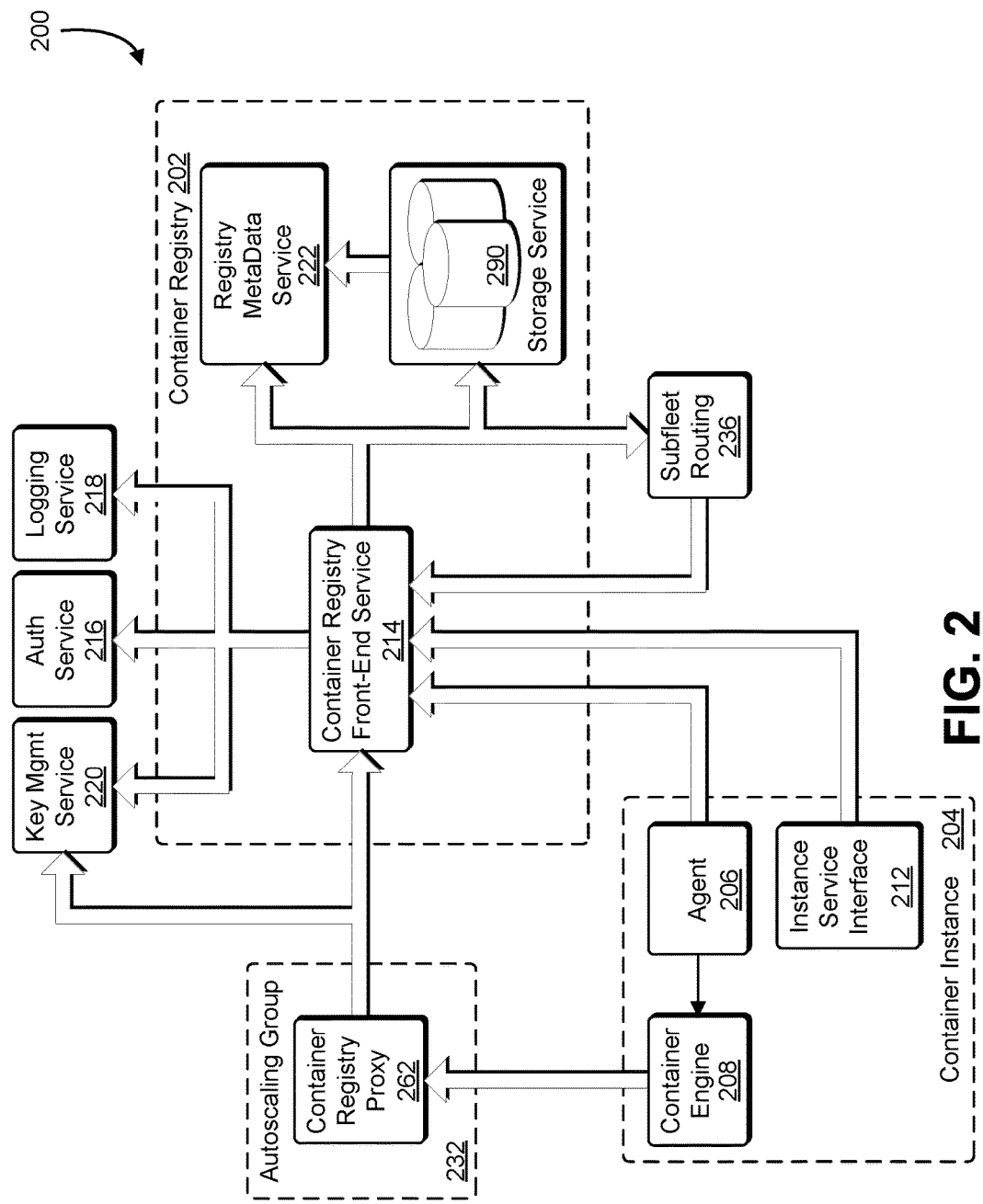
FIG. 2 illustrates an example of a software container registry service environment in accordance with an embodiment.

FIG. 2 illustrates an aspect of an environment 200 in which an embodiment may be practiced. As illustrated in FIG. 2, the environment 200 may include a container registry 202 comprising a container registry front-end service 214, a registry metadata service 222, and a storage service. The registry metadata service 222 may be a structured (i.e., non-relational, non-SQL, or not-only SQL) data storage service that hosts a scalable, distributed database for storing metadata about the container images and/or container image layers. That is, in order to support increasing amounts of metadata, the database of the registry metadata service 222 may be distributed across a fleet of hosts, such that a portion of data may be stored on one host and another portion of data may be stored on another host such that there may be routing to determine which host or hosts contain the metadata needed to be retrieved.

Although relational data storage may be used for the metadata storage, advantages presented by separating metadata storage from the storage service 290 and utilizing a structured storage for the registry metadata service 222 includes design simplicity, flexibility, horizontal scalability (i.e., the ability to add more compute nodes to a cluster hosting the database in order to accommodate increasing database size while maintaining performance objectives), and improved performance. Metadata stored by the registry metadata service 222 may include a historical record of changes in the repository and version tracking information, and manifests for container images stored in the storage service 290. A manifest may comprise metadata such as an identity of the container image that corresponds to the manifest, and, for each layer listed in the manifest, a content-addressable identifier that uniquely corresponds to a respective layer and a checksum for verifying the integrity of the content of the layer. In some examples, a "container image" may be a virtual file system comprising a collection of data objects that make up the software application. The manifest may be a file written in any suitable format, such as Extensible Markup Language ("XML") or JavaScript Object Notation (JSON).

The storage service 290 may be a storage location configured to store application repositories and container image layers. In some examples, an "application repository" may refer to a data structure for versioning and storing metadata for a set of files and/or directories of a software application. In an embodiment, the registry metadata service 222 is a structured data storage in a database, and the storage service 290 simply stores data (e.g., binary large objects, files, data of varying types and sizes, etc.) as data objects. In this embodiment, the registry metadata service 222 stores information about which data object is in which repository of which registry. In this manner, the container registry front-end service 214 may query the registry metadata service 222 for the location of a data object in the storage service 290, and, as a result of receiving the location, may retrieve the data object corresponding to the location from the storage service 290.

Furthermore, in embodiments the registry metadata service 222 may provide support for storing container images and layers in multiple storage locations. For example, a container image and/or software layer may be stored on multiple servers (e.g., at the request of a customer, automatically to various servers of a content delivery network, etc.) of the storage service 290 (which may be located in different geographic regions) in order to provide optimal throughput for distributing the container image and/or software layer to customers of the computing resource service provider. The metadata within the registry metadata service 222 for the container image and/or software layer may be updated to reflect all of the storage locations (e.g., uniform resource names) for the container image and/or software layer at the multiple servers where the container image and/or software layer is stored. In this manner, separation of the metadata from the storage service 290 to the registry metadata service 222 provides the flexibility to query for data about container images and software layers in various ways. Upon a request to retrieve/download a container image, the container registry front-end service 214 may query the registry metadata service 222 to obtain a list of storage locations for the container image, make a determination of which storage location of the list from which to retrieve the container image to provide optimal efficiency for the customer and/or the computing resource service provider, and provide the container image to the customer and/or customer container instances from the determined location.

A container image may be stored as a container image layer. Each time the container image is updated, a new container image layer may be created. Each container image layer may only contain data objects that have changed since the previous version of the container image. Accordingly, a layer may include a manifest that links to data objects within previous layers that have not changed such that a particular version of a container image may be launched from a layer which itself does not include all data objects of the container image.

The system of the present disclosure may coexist with a software container service such as the software container service described in U.S. patent application Ser. No. 14/538,663, filed Nov. 11, 2014, entitled "SYSTEM FOR MANAGING AND SCHEDULING CONTAINERS," incorporated by reference herein. In the environment 200 of FIG. 2 of the present disclosure, a container instance 204 may be launched and may be hosting one or more software containers in a distributed computing environment of a computing resource service provider. A service provided by a computing resource service provider may be one of one or more service configured to provide access to resources of a computer system including data processing, data storage, applications, interfaces, permissions, security policies, encryption, and/or other such services. A container service may be provided as a service to users of a computing resource service provider by, for example, providing an interface to the container instance 204.

In some embodiments, the services provided by a computing resource service provider include one or more interfaces that enable the customer to submit requests via, for example, appropriately-configured application programming interface calls to the various services. In addition, each of the services may include one or more service interfaces that enable the services to access each other (e.g., to enable a virtual computer system of the virtual computer system service to store data in or retrieve data from an on-demand data storage service and/or access one or more block-level data storage devices provided by a block-lever data storage service). Each of the service interfaces may also provide secured and/or protected access to each other via encryption keys and/or other such secured and/or protected access methods, thereby enabling secure and/or protected access between them. Collections of services operating in concert as a distributed computer system may have a single front-end interface and/or multiple interfaces between the elements of the distributed computer system.

Within the container instance 204, a software application known as an agent 206 may be running. The agent 206 may be configured to manage containers and communicate with a container engine 208. The agent 206 may receive commands for managing software containers from a container scheduler or other communications service. The container engine 208 may also include a container service interface, such as a command line interface, through which a customer of the computing resource service provider or other authorized entity may communicate with the container engine 208. The container instance 204 may also include an instance service interface 212 (e.g., a command line interface) through which the customer or other authorized entity may communicate to the container registry front-end service 214. In some embodiments, the container engine 208 and/or the instance service interface 212 are executed on a local computer system by the customer, rather than within the container instance 204.

As noted, the container engine 208 may be configured to communicate with the container registry proxy 262. The container registry proxy 262 may be responsible for communicating with the container registry front-end service 214 to store container images in the and repositories of the storage service 290 and serve container images from the storage service 290 to container instances of customers, such as the container instance 204, through a container service of a computing resource service provider, such as the container service described in U.S. patent application Ser. No. 14/538,663, incorporated by reference herein. The container service may be a service comprising a collection of computer resources provided to a customer by a computing resource service provider and configured to instantiate containers on behalf of a customer. The customer may interact with the container service to provision, place and operate software containers that are instantiated on virtual or non-virtual computer devices hosted and operated by the computing resource service provider. The software containers may be used for various purposes, such as to support a website or database applications, to execute business or electronic commerce applications, or, generally, to serve as compute power for the customer.

The container registry proxy 262 may provide private access control through the authentication service 216. Application programming interface calls made to the container registry proxy 262 may be recorded through the transaction logging service 218. However, in some embodiments, the container registry proxy 262 is not limited to use with a container service, but may be configured to be compatible with various containerization platforms (e.g., Docker, Rocket, etc.). Each customer running container instances hosted by the computing resource service provider may be allocated one or more repositories in the container registry proxy 262 for storing container images. The customer may cause one or more repositories to be created, deleted, or modified by invoking the proper application programming interfaces of the container registry front-end service 214.

The container registry proxy 262 may function at least in part as a proxy for communication between the container engine 208 and the application programming interfaces (APIs) of the container registry front-end service 214. The container registry front-end service 214 may be a set of APIs and endpoints that are made accessible to customers of the computing resource service provider. The customers may call the APIs and endpoints through the instance service interface 212 or through the container registry proxy 262. The container registry front-end service 214 may be similar to the container registry front-end service 114 of FIG. 1.

The container registry front-end service 214 may be configured to utilize one or more other services of the computing resource service provider, such as an authentication service 216, a transaction logging service 218, and/or the key management service 220. The container registry front-end service 214 may be further configured to use a registry metadata service 222.

The registry metadata service 222 may be configured to store information about data objects in a metadata store 124. The registry metadata service may comprise one or more data stores separate from the data stores of the container registry. The primary responsibility of the registry metadata service 222 may be to provide fast access to layer and tag information of software containers. The registry metadata service 222 may store container image manifests, tag information, and revision history of container images in the storage service 290. By storing this metadata separately in the registry metadata service 222, the registry metadata service 222 may provide a fast interface for operations seeking or utilizing this information. Another advantage presented by storing metadata separately in the registry metadata service 222 is that metadata about the data stored in the storage service 290 may be manipulated (e.g., modified, marked for deletion, mark as inaccessible, etc.) in the registry metadata service 222 without locking data in the storage service 290.

The autoscaling group 232 may be a group of computing nodes that can have their numbers increased or decreased according to predefined conditions (e.g., processing unit load falling above or below a specified threshold, etc.). For example, the scaling service manager may decrease the number of computing nodes in the auto-scaling group during low demand by removing computing nodes from the group and may increase the number of computing nodes in the auto-scaling group during demand peaks by instantiating or adding computing nodes to the auto-scaling group. In some embodiments, a customer can provide, such as through a web interface or application programming interface, the conditions that cause computing nodes to be added or removed from the auto-scaling group for the customer's respective repositories. In this manner, computing capacity for the container repository can be increased or decreased according to conditions specified by the customer.

Figure 3:
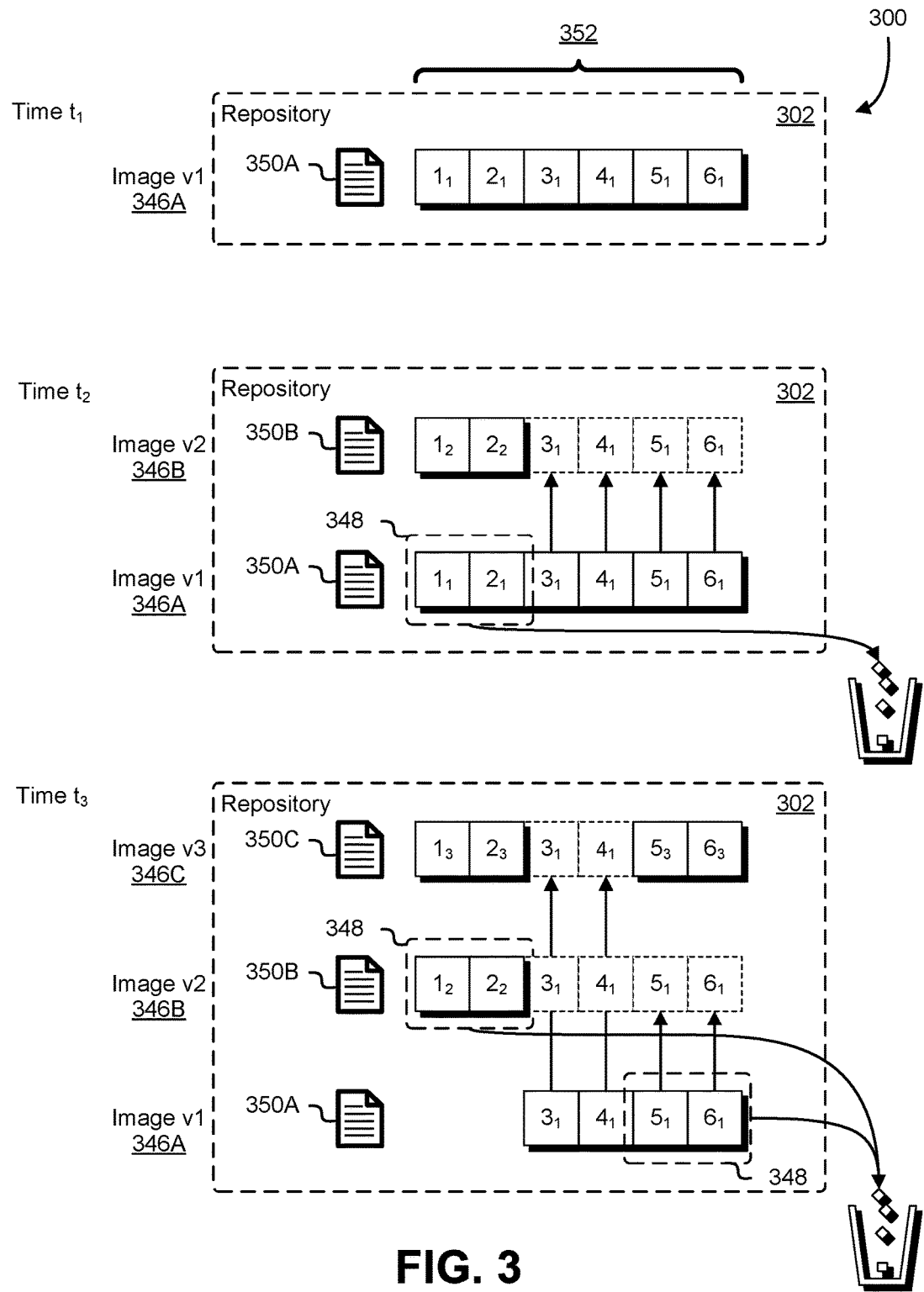
FIG. 3 illustrates an example of garbage collection of container images in accordance with an embodiment.

FIG. 3 illustrates an example 300 garbage collection of an embodiment of the present disclosure. Specifically, FIG. 3 depicts a container image 352 comprising a series of six layers (labeled as subscripts 1, 2, 3, 4, 5, and 6) that has been uploaded to a registry 302, such as the container registry 202 of FIG. 2, three times (images 346A-46B) over three time periods. A series of layers may begin with a base image/layer for the underlying operating system (e.g., Ubuntu, Fedora, etc.). For example, layers 1-3 of the container image 352 may comprise layers of the underlying operating system. Layers 4-6, likewise, may comprise layers of one or more software applications (e.g., WordPress, Apache HTTP Server, etc.) to be installed to the underlying operating system. Each layer may have an associated content-addressable identifier, which may be generated by calculating a checksum (e.g., MD5, SHA1, SHA256, SHA512, etc.) for the layer. At a first time (time $t_1$), the container image 352 is stored in the registry 302 as an initial version 346A (image v1). Because none of the layers 1-6 have been previously stored in the registry 302, all of the layers are stored in the registry 302 as the initial version 346A (with subscript 1 representing the layer version) with a manifest 350A that describes the layers in the container image 352 and their locations.

In some examples, a "manifest" may refer to metadata about the container image as well as metadata about the set of layers that the container image is comprised of. The manifest may be stored as a separate file, or in a database in a separate field from the container image. In this manner, the manifest specifies which layers are associated with the container image, and thus, when a new container image is uploaded, it can be determined from the manifest which layers of the image may or may not already be stored in the registry 302. The manifest may be a file written in any suitable format, such as using JSON.

At a second time (time $t_2$), a new version of the container image 352 is uploaded to the registry 302. A determination is made that only layers 1 and 2 have changed since the container image 352 was saved as the initial version 346A. Consequently, the second version 346B (image v2) is stored with the updated layers $1_2$ and $2_2$ and a manifest 350B indicating the locations of the layers of the version of the container image 352 at the second time (e.g., that layers $1_2$ and $2_2$ may be found with the second version 346B and that layers $3_1$-$6_1$ may be found with the initial version 346A). It can be seen in the example 300, however, that after time $t_2$, storage space is being taken up by layers that are no longer being referenced by the most recent version/manifest (image v2). That is, layers $1_1$-$2_1$, stored with the initial version 346A are orphaned (i.e., unlinked to a tagged container image in the manifest) in the registry 302.

Likewise, it can be seen that, at a third time (time $t_3$), another new version of the container image 352 is uploaded to the registry 302 and a determination is made that layer 6 has changed since the previous version (the second version 346B) was stored. Consequently, a third version 346C (image v3) is stored with the updated layer $6_3$ and a manifest 350C indicating the locations of the layers of the container image 352 at the third time (e.g., that layers $1_2$ and $2_2$ may be found with the second version 346B, that layers $3_1$-$5_1$ may be found with the initial version 346A, and that layer $6_3$ may be found with the third version 346C). Again, it can be seen in the example 300, however, that after time $t_3$, storage space is being taken up by layers that are no longer being referenced by the most recent version/manifest (image v3). That is, layers $5_1$ and $6_1$, stored with the initial version 346A are orphaned (i.e., unlinked to a tagged container image in the manifest) in the registry 302.

The system of the present disclosure contemplates garbage collection functionality to clean out unreferenced layers and versions from the registry 302. Unreferenced layers may include layers that have been flagged/marked as containing a security vulnerability (e.g., in the manner described in FIGS. 4 and 5). In some embodiments, one or more application programming interfaces relating to garbage collection are provided to customers, and garbage collection may be performed on a particular repository in response to a call to one of the application programming interfaces (e.g., CleanRegistry( )) at the behest of the customer associated with the particular repository. Garbage collection additionally may be performed as a security precaution; for example, in an event where a customer inadvertently uploads an insecure version of the container image (e.g., credentials embedded in a file, etc.), the customer may upload a corrected version of the container image and then call a garbage collection application programming interface to delete/remove the previous version (i.e., the insecure version) of the container image from the repository. Alternatively, rather than uploading a corrected version of the container image, the customer may call the garbage collection application programming interface to delete/remove the most recent uploaded container image (i.e., the insecure container image), and then go back to using the previous version of the container image; effectively performing a rollback.

In other embodiments, garbage collection is performed automatically according to a predefined schedule or upon the occurrence of predetermined events. For example, garbage collection may be performed each Saturday at midnight. As another example, garbage collection may be performed for every 1,000 gigabytes of data uploaded to the repository. As still another example, garbage collection may be performed each time a container image is stored in the repository.

Tags may be applied to one or more container images by the customer. In some examples, a "tag" may refer to a label associated with one or more container images for the purpose of grouping the container images. For example, a tag may be created with the label "latest version." In this example, at an initial time (time $t_1$), a set of container images, including the initial version 346A may be tagged as the "latest version." At the next time (time $t_2$), another set of container images, including the second version 346B, may be updated (e.g., per request from the customer uploading the other set of container images) to be the "latest version." In this case, the tag, "latest version" now would no longer point to the initial version 346A, rendering the initial version 346A untagged. Likewise, at a third time (time $t_2$), a third set of container images, including the third version 346C, may be updated to be the "latest version," in which case the second version 346B would be left untagged, and so on. Tags may overlap; for example, a container image tagged as "engineering configuration" may include layers that are also used in a container image tagged as "marketing configuration." In a situation where an instruction has been given to garbage collect/delete "engineering configuration"-tagged container images, the system of the present disclosure may retrieve a list of the "engineering configuration" container images, and, based on metadata about those container images, determine which layers of the "engineering configuration container" images may also be tagged with a different active tag (e.g., "marketing configuration"). The layers of container images tagged with "engineering configuration" may be deleted only if they are not tagged by another active tag; e.g., the layers of container images tagged with a "marketing configuration" may not be deleted.

The metadata about the container images may be stored in a registry metadata service, such as the registry metadata service 222 of FIG. 2. In this way, the registry metadata service may be queried for the metadata rather than the container registry itself, in order to quickly and efficiently determine which layers/images can be cleaned up during garbage collection without burdening the container registry with metadata queries. Returning to FIG. 3, a process for garbage collection may begin by reading the most recent manifest for the container image 352 (e.g., the one tagged "latest version") to determine the locations of the layers for the current version of the container image 352. Then, the process may walk backwards through the previous manifests and versions of the container image 352 to locate layers not referenced by the most recent manifest. Depending on the particular implementation, these located layers may be immediately deleted or may be flagged/marked for deletion (e.g., corresponding metadata in the metadata store may be updated to include/append a code, label, or symbol signifying that the layer is to be deleted) at a later date (e.g., according to a predetermined schedule or scheme). At the later date, a deletion service or process may go through the repository, identify the layers flagged for deletion, and delete the identified layers. If all layers for an image are unlinked, the entire image may be flagged as un-referenceable, and, to the customer, may appear as though it has been deleted (e.g., the image may be inaccessible and unlistable/unviewable to the user).

As a result of garbage collection run after time $t_2$, layers $1_1$-$2_1$ may be deleted or flagged as un-referenceable 348. Likewise, as a result garbage collection run after time $t_3$, layers $5_1$ and $6_1$ may be flagged as un-referenceable 348. Objects flagged as un-referenceable (e.g., the orphaned layers described above and layers flagged as un-referenceable in the manners described in FIGS. 4 and 5) may be deleted according to a predetermined schedule or scheme, and customers may be prevented from launching container images having un-referenceable objects (e.g., requests to launch container images including un-referenceable objects may be denied). Furthermore, customers may be unable to view, list, or locate un-referenceable objects, and it may appear to the customers as if the objects were deleted, but may, in fact, only be hidden from the customers by the system of the present disclosure. Consequently, the system of the present disclosure may prevent container images having layers flagged as un-referenceable from launching, and, in some implementations, may flag such container images themselves as un-referenceable. Referring back to FIG. 2, the operations of the garbage collection of FIG. 3 may query the registry metadata service 222 to find repositories upon which to perform garbage collection operations, perform the garbage collection, and communicate with the container registry 202 to actually remove orphaned layers.

Figure 4:
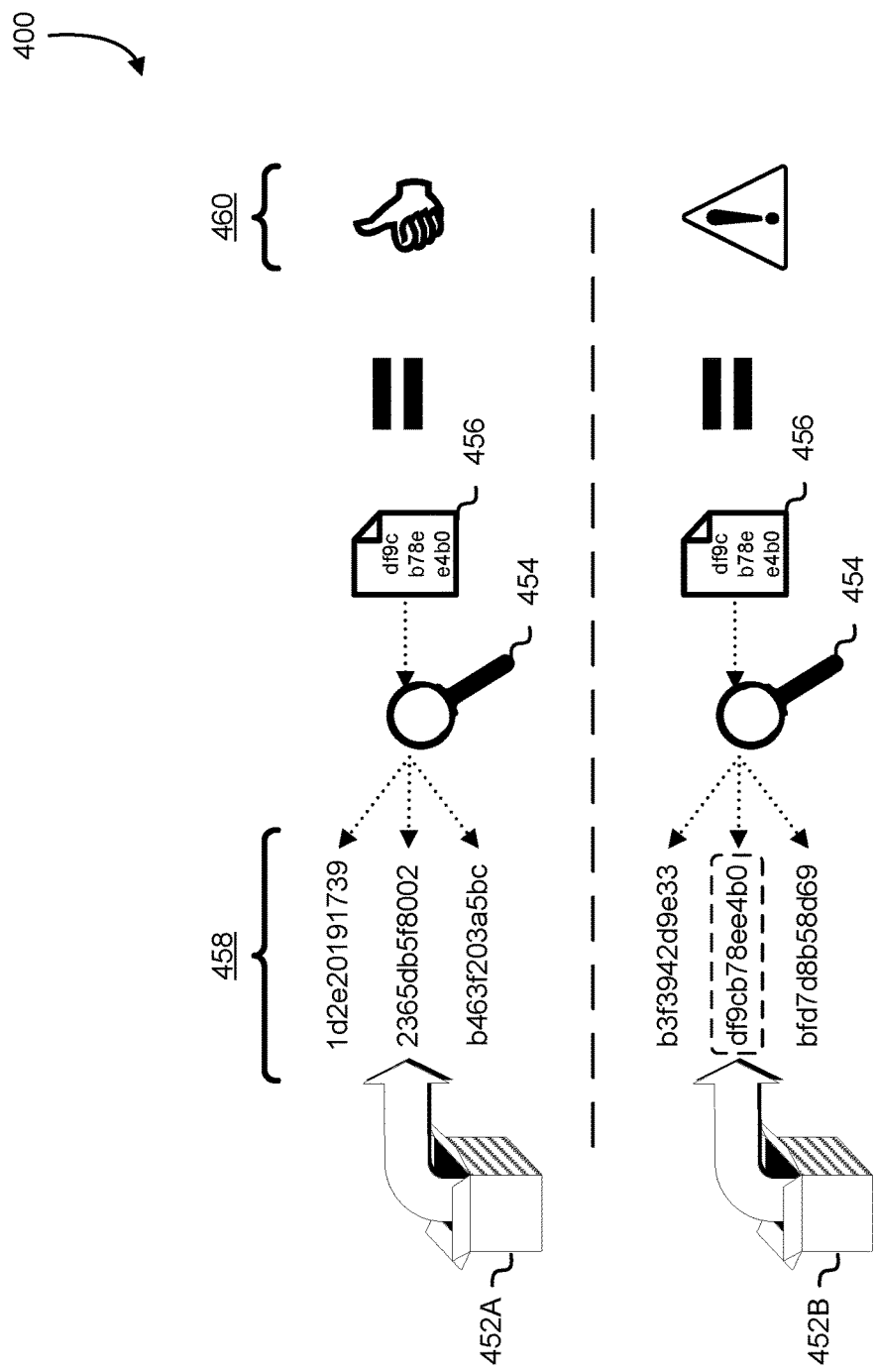
FIG. 4 illustrates an example of vulnerability sweeps of container images in accordance with an embodiment.

FIG. 4 illustrates an example 400 of an embodiment of the present disclosure. Specifically, FIG. 4 depicts a security sweep of one or more repositories of a container registry, such as the container registry 202 of FIG. 2. In some embodiments, the system of the present disclosure is configured to perform security sweeps based on security vulnerabilities, licensing, or other compliance issues. For example, because container images in the repository are comprised of layers, if it is known that a layer has a security vulnerability, the security sweep of the present disclosure may scan container images in the repository looking for that particular layer. If the security sweep finds the particular version of the particular layer within a container image, it may flag it for some further security action. Security actions may include sending an alert/notification to the customer whose repository in which the insecure layer was found, preventing the container image in which the insecure layer was found from being launched, deleting the container image in which the insecure layer was found, automatically updating the container image to include a version of the software application without the security vulnerability (e.g., a previous version, the latest version, etc.), and so on. As noted, each layer may be associated with a content-addressable identifier (e.g., checksum), in which case the security sweep may be efficiently conducted by only looking for the occurrence of the content-addressable identifier associated with the security vulnerability, thereby saving the need for scanning individual files of each container image.

For example, referring back to FIG. 3, if it is known (e.g., by system administrators of the computing resource service provider, by the customer, by a vendor of the container image, etc.) that a particular layer of the container image of an underlying Ubuntu operating system has a security vulnerability, the security sweep may scan the registry 302 for occurrences of a content-addressable identifier associated with that particular layer. For example, the security sweep may discover from the manifest 350B that the content-addressable identifier of layer $2_2$ listed in the manifest 350B matches the content-addressable identifier provided to the security sweep associated with the insecure layer. Consequently, the security sweep may flag layer $2_2$ as un-referenceable, thereby preventing layer $2_2$ from being used.

In FIG. 4, the security sweep 454 is searching repositories 452A-52B for a layer that has a known security vulnerability. In the example 400, the security vulnerability is known to be associated with a content-addressable identifier, illustrated in the example 400 as the reference identifier 456. For example, it may be that a publicly available layer of a particular version of an operating system has a known Secure Shell (SSH) vulnerability, and the publicly available layer has a content-addressable identifier of "df9cb78ee4b0," the security sweep 454 may search the manifests in the repository for content-addressable identifiers of layers matching "df9cb78ee4b0." Whether a security vulnerability exists may be determined by a vendor of software (e.g., a vendor providing the particular publicly available layer of the previous example), determined by the computing resource service provider hosting the container registry/repositories, or determined by the customer of the computing resource service provider associated with the particular repository being swept.

In the latter case, in some implementations a container registry front-end service, such as the container registry front-end service 214 of FIG. 2, provides an application programming interface that the customer can call and through which the customer can specify a content-addressable identifier for the layer that the customer wishes to have swept from his/her repository by the security sweep 454. In this latter case, the reasons for performing the sweep may be at the discretion of the customer and may not necessarily be for security vulnerability purposes; e.g., the customer may simply decide that certain applications should be updated or no longer need to be included in the container image. As noted in the present disclosure, in some embodiments the manifests/metadata is searched using a registry metadata service, such as the registry metadata service 222 of FIG. 2. In some embodiments, a customer can specify, such as through an application programming interface service provided by a container registry front-end service, one or more content-addressable identifiers proactively; that is, the customer may specify that if the security sweep 454 ever finds a match between the one or more content-addressable identifiers and a layer in the repository to perform some action (e.g., flag the layer, notify the customer, rolled back to a previous version, etc.). Additionally or alternatively, in some embodiments, a customer can specify (e.g., via an application programming interface, through a user interface, etc.) whether or not to perform a vulnerability sweep on one or more repositories of the customer, which levels of vulnerabilities to ignore (e.g., vulnerabilities may be assigned levels according to an amount of security risk they present), and which what actions to perform for different levels of vulnerabilities (e.g., delete software images associated with high levels and terminate any applications that may be running that correspond to the deleted software images, roll back a software image associated with medium levels to a previous version, send a notification message to the account of the customer as a result of detecting a low level vulnerability, etc.).

In a first scenario, the security sweep 454 searches the manifests of the first repository 452A for a match between the reference identifier 456 and the content-addressable identifiers 458 of the layers stored in the first repository 452A. As can be seen from the example 400, no match to the reference identifier 456 is found in the first scenario, and the output 460 from the sweep is that no security vulnerabilities were found. In a second scenario, the security sweep 454 searches a second repository 452B for a match between one of the content-addressable identifiers 458 of the layers in the second repository 452B and the reference identifier 456. As can be seen in this scenario, the security sweep 454 found a match between the reference identifier 456 and one of the content-addressable identifiers 458 of the layer in the second repository 452B. Consequently, the output 460 from the second scenario is that a security vulnerability corresponding to the reference identifier 456 was found. Based on this output, various security measures may be taken such as deletion of the layer with the security vulnerability, automatic update of the layer to a version not having the security vulnerability, and/or notification of a customer associated with the second repository 452B that the repository contained a security vulnerability. Because the security sweep 454 only searches for content-addressable identifiers, is minimally intrusive (i.e., does not actually look at the contents of the layer) and the actual container image itself may be encrypted in the repository without affecting the security sweep 454. Referring back to FIG. 2, the operations may query the registry metadata service 222 to find repositories upon which to perform security sweep operations and compare content-addressable identifiers 458 with the reference identifier 456.

Figure 5:
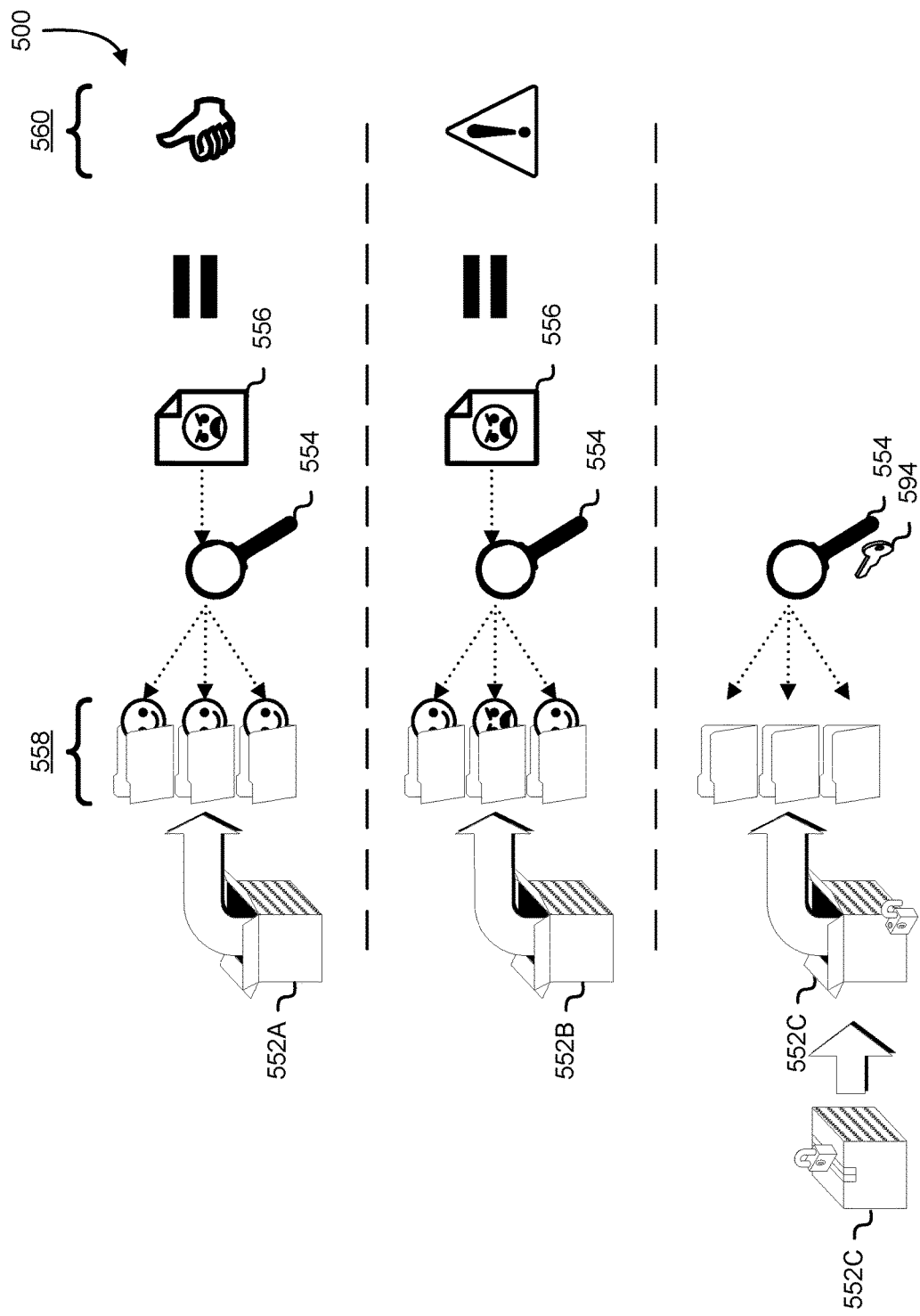
FIG. 5 illustrates an example of security scans of container images in accordance with an embodiment.

FIG. 5 illustrates an example 500 of an embodiment of the present disclosure. Specifically, FIG. 5 depicts a scanning mechanism 550 for scanning container images stored in the repository for data defined by users (e.g., malware, sensitive data, trade secret data, etc.). Although this scan bears similarities to the security sweep illustrated in FIG. 4, the scanning mechanism 554 may perform a deeper scan than searching for a matching content-addressable identifier. That is, the scanning mechanism 554 may open each container image (which may be stored as a tarball or other archive file format) in a specified repository, and scan through the image files for specified (e.g., specified through an application programming interface of a container registry front-end service) criteria, depicted in the example 500 as the reference criteria 556. The criteria may be a digital fingerprint, such as bit string that, for all practical purposes, uniquely identifies the computer file or a characteristic (e.g., the malware, virus, trade secret, or other vulnerability) being sought, such that the scanning mechanism 554 may search one or more a computer files in a layer for the occurrence of a digital fingerprint. Note that in some implementations, the criteria may be a set of conditions (e.g., a file that is executable, has a file name that begins with "x," has a file size less than 500 kilobytes, and was last modified between the dates of Oct. 24, 2009 and Nov. 1, 2009).

In one example, a customer associated with a repository may request that the repository be scanned for the presence of specified credentials (e.g., such as if an application were compiled with hardcoded access credentials). In this example, the customer may specify the credentials as the reference criteria 556. The scanning mechanism 554 may also search the manifest for the presence of the reference criteria 556. In another example, the customer may specify one or more signatures of known malware as the reference criteria 556, and thereby direct the scanning mechanism to scan the repository for the presence of such malware. In still another example, the customer may specify one or more character strings or filenames associated with a trade secret or sensitive data as the reference criteria 556, and the scanning mechanism 554 may search the files within the opened/unpacked layers for a match to the one or more specified character strings or filenames.

In an example implementation, the repositories comprise one or more data stores, and each stored container image is stored within one of the data stores. After each container image is scanned for the presence of specified reference criteria, a table may be updated to include a timestamp indicating at which time the container image was scanned for the specified reference criteria. In this manner, the timestamp may be retrieved at the behest of the customer as evidence of when the container image was scanned for the specified criteria.

In some embodiments, customers can specify, such as through an application programming interface, certain reference criteria that current and/or future container images should be scanned for. In this manner, as new container images are uploaded to the repository, they may be unarchived and scanned for any of the reference criteria previously specified by the customer. Furthermore, in some implementations, container images may be scanned as part of the process of launching the container image into a software instance; e.g., the container image may be opened/unpacked and scanned prior to launching it into a software container.

However, if the customer has directed that the container images be encrypted in the repository and the scanning mechanism 554 does not have access to a key to decrypt the container images, the scanning mechanism 554 may be unable to scan the container images for the reference criteria 556 in this manner. Therefore, additionally or alternatively, in some of these embodiments, whenever any of the container images of the customer stored in the repository are opened/decrypted under the authority of the customer (e.g., such as to launch in a container instance such as the container instance 204 of FIG. 2), the scanning mechanism 554 can be configured to scan the opened container image for any of the previously specified reference criteria. In these latter embodiments, the scanning mechanism 554 is able to scan encrypted container images without having access to the decryption key.

In some implementations, however, a decryption key for the container images is shared with the scanning mechanism 554. In these embodiments, the scanning mechanism 554 is configured to use the shared decryption key to decrypt the container images in order to scan for the reference criteria 556. Reference criteria 556 may include criteria such as names of known binaries, instructions to scan for files lacking checksums, scanning of known file names, scanning text files for a specified string of characters, and so on. The reference criteria 556 may include restrictions or exceptions for scanning of certain file types; for example, the reference criteria 556 may include instructions specifying that certain image file types be exempt from scanning.

Thus, FIG. 5 depicts a first scenario where the scanning mechanism 554 opens a first container image 552A and scans through a file structure 558, searching for the reference criteria 556. As can be seen from the example 500, no match to the reference criteria 556 is found in the first scenario, and the output 560 from the scan is that no match was found. In a second scenario, the scanning mechanism 554 again opens a second container image 552B and scans through the file structure 558, searching for the reference criteria 556. However, in the second scenario it is seen that a match is found in the second container image 552B with the reference criteria 556. Consequently, the output 560 from the second scenario is that a match was found with the reference criteria 556. The output 560 that a match was found may result in one or more actions, including notifying a customer associated with the repository in which the second container image was stored that a match was found, flagging the second container image 552 or its layers as un-referenceable, or deletion of the second container image 552B.

Note that in various embodiments, a match does not necessarily require equality. For example, two values may match if they are not equal, but mathematically equivalent. As another example, two values may match if they correspond to a common object (e.g. value) or are in some predetermined way complementary and/or they satisfy one or more matching criteria. Generally, any way of determining whether there is a match may be used.

FIG. 5 further depicts a third scenario. In the third scenario, a container image 552C is stored in the repository in encrypted form. However, if the container image 552C is decrypted (such as by an entity authorized by the customer to extract and launch the container image or by providing the scanning mechanism 554 with a decryption key 594 for decrypting the container image, as described above), the scanning mechanism 554 would be able to scan the unencrypted file structure as shown in the third scenario. For example, if the customer provided the computing resource service provider enough access to unencrypt the container image 552C, such as by sharing the decryption key 594 with the computing resource service provider, the scanning mechanism 554 may be able to unencrypt the container image 552C and/or layers of the container image 552C to scan the contents. In some examples, the decryption key 594 may be shared with the computing resource service provider such that the computing resource service provider maintains it in secret and uses it to perform scanning at any time. In other examples, the decryption key 594 may be shared from the customer at any time that the customer requests that the computing resource service provider perform scanning on the container image 552C. In still other examples, the customer shares the decryption key 594 with the computing resource service provider in order to launch the container image 552C into a software container, and, concurrent with the launching, the computing resource service provider may decrypt and perform scanning on the container image 552C in the manner described. Referring back to FIG. 2, the operations may query the registry metadata service 222 to find repositories upon which to perform the scanning operations.

In some embodiments, the system of the present disclosure provides end-to-end container encryption. That is, a container registry front-end service, such as the container registry front-end service 214 of FIG. 2, may provide an application programming interface to a customer that allows the customer to upload a container image to a repository of the customer to be stored in encrypted form using server-side encryption. When the customer requests to launch the container image in a container instance (such as through another application programming interface), the servers of the system of the present disclosure may control the decryption and launching of the container image in the container instance such that, once uploaded, the container image never leaves the environment of the computing resource service provider in unencrypted form, thereby preventing unauthorized access and/or duplication of the container image. In this manner, software vendors may provide their software in global repositories and allow other users/customers to run (e.g., in exchange for a fee) their software in the environment of the computing resource service provider without the risk of unauthorized duplication of their software. In some embodiments, a key management service, such as the key management service 220 of FIG. 2 can issue a key (such as a public key of a public-private key pair) to the customer so that the customer can perform client-side encryption of container images, with the system of the present disclosure having access to a key for decryption (such as the private key of the public-private key pair) in order to perform scans for vulnerabilities, such as in the manner described for the third scenario of FIG. 5. For example, the customer may encrypt a container image and upload the container image through the container registry front-end service, whereupon the system of the present disclosure may decrypt the container image in memory and scan the decrypted container image for reference criteria.

Figure 6:
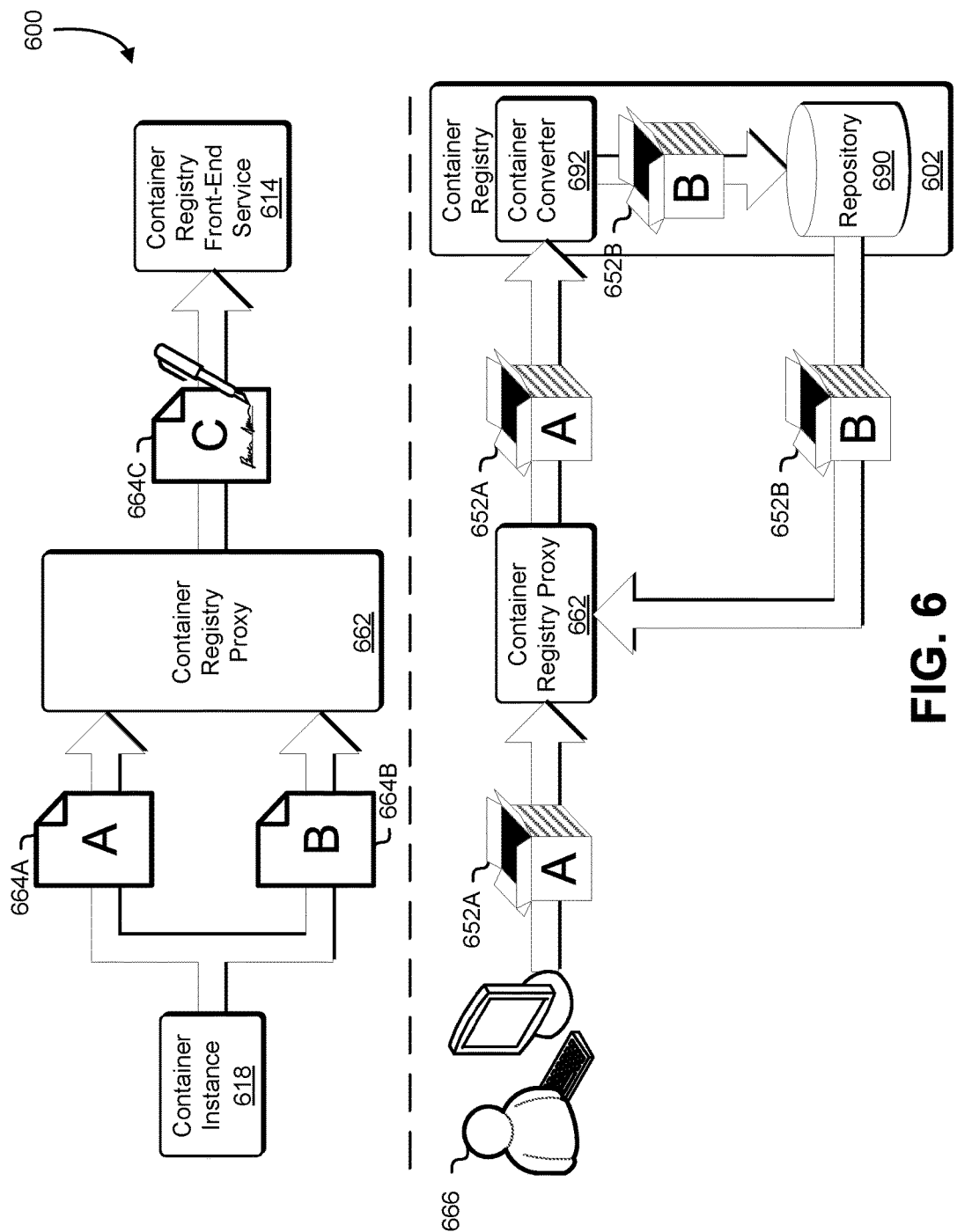
FIG. 6 illustrates an example of a container registry proxy for container images in accordance with an embodiment.

FIG. 6 illustrates examples 600 another embodiment of the present disclosure. Specifically, FIG. 6 depicts functionality of a container registry proxy 662 being used a system of the present disclosure to translate from one container engine to another. In a first example, a container instance 618 is hosting a running container of using a particular container engine (e.g., the Docker container engine, the Rocket container engine, etc.). Because different container engines may have their own application programming interfaces and own protocols, in the first example, the container registry proxy 662 operates as a proxy that converts application programming interface requests from the particular container engine running in the container instance 618 and converts/translates the requests to a predetermined format acceptable by the container registry front-end service 614. As shown in FIG. 6, the container running in the container instance 618 makes a request, which could be a first type 664A (i.e., corresponding to a first container engine type) of request or a second type 664B (i.e., corresponding to a second container engine type) of request. The container registry proxy 662 intercepts the request, and, regardless of whether the request was received as the first type 664A or the second type 664B, the container registry proxy may convert the request to either the first type 664A, the second type 664B, or even, as shown, a third type of request 664C (i.e., whichever type of request format the container registry front-end service 614 is configured to support). For example, among other things, the third type of request 664C may include a digital signature (which may be signed using a session key in a manner similar to that described in U.S. patent application Ser. No. 13/248,953, entitled "TECHNIQUES FOR CLIENT CONSTRUCTED SESSIONS," incorporated by reference), from the container service that provides proof of authorization to service endpoints of other components of the environment in which the container is running (e.g., a distributed computing system of a computing resource service provider), such as the container registry front-end service 214 of FIG. 2, that the container is authorized to have the particular request fulfilled.

As an example, a command for listing all of the tags of the container image of a first container engine type may have a specific format (e.g., "/[version number]/[repository name]/tags"). However, a container registry front-end service may be configured to accept different parameters, a different order of parameters, and/or additional parameters. The container registry proxy 662, then, may intercept the command, separate/extract the parameters provided with the command, and reformat/translate the command in the appropriate order and with the appropriate parameters into a format compatible with the container registry front-end service.

In a second example, a customer 666 has uploaded a container image of a first container engine type 652A to the customer's repository in a container registry 602. The container image may be uploaded through a container registry proxy 662, which may be similar to the compatibility registry proxy 262 of FIG. 2. From there, the container image of the first container engine type 652A may be forwarded to a container converter 692 in the container registry 602. In some examples, the term "customer" may refer to a system of a customer entity (such as an individual, company, or other organization) that utilizes services provided by a computing resource service provider. Examples of such a system may be an individual computing device, a mainframe, a customer accessible virtual machine instance, or other system capable of communicating with one or more of the provided services.

In an embodiment, the container converter 692 is configured to receive the container image of the first container engine type 652A and rebuild the container image as a container image of a second container engine type 652B and store the container image of the second container engine types 652B in the repository 690 of the customer 666. In this manner, the container registry 602 provides the customer 666 with the option of running the container image using either container engine type (A or B) or both. Another advantage provided by the container registry proxy 662 of the second example, may be that, if the container service is only configured to receive requests from a specific, compatible container engine type, the container registry proxy 662 can discreetly (i.e., without being apparent to the customer 666) convert a container image built by the customer 666 using an incompatible container engine type into a container image having the specific, compatible container engine type. Alternatively, rather than storing the container image of the second container engine type 652B in the container registry 602, the container registry proxy 662 may rebuild the container image of the first container engine types 652A into the container image of the second container engine type 652B on-the-fly in response to a request to launch the container image in a container instance as the second container engine type 652B. Finally, in the second example, upon receiving a request to launch the container image, the container image of the second container engine type 652B may be retrieved from the repository 690, whereupon it will pass through the container registry proxy 662, which will then ensure that the correct container engine is used when the container image is launched in an instance.

Referring back to FIG. 2, the functionality of container registry proxy 662 of FIG. 6 may reside within the autoscaling group 232 or be integrated with the functionality of the container registry 202 itself. The container registry proxy 662 may perform its translation based on input from the container engine 208, that input including request information and an authorization token, which may be similar to the security token 974 of FIG. 9. The container registry proxy 662 may have access to a key management service, such as the key management service 220, for decrypting and obtaining information from the authorization token, such as credentials and/or additional information about the customer and/or the customer account. Based on the information yielded from the authorization token, the container registry proxy 662 may place application programming interface calls to the container registry front-end service 214 under the authority of the customer.

Figure 7:
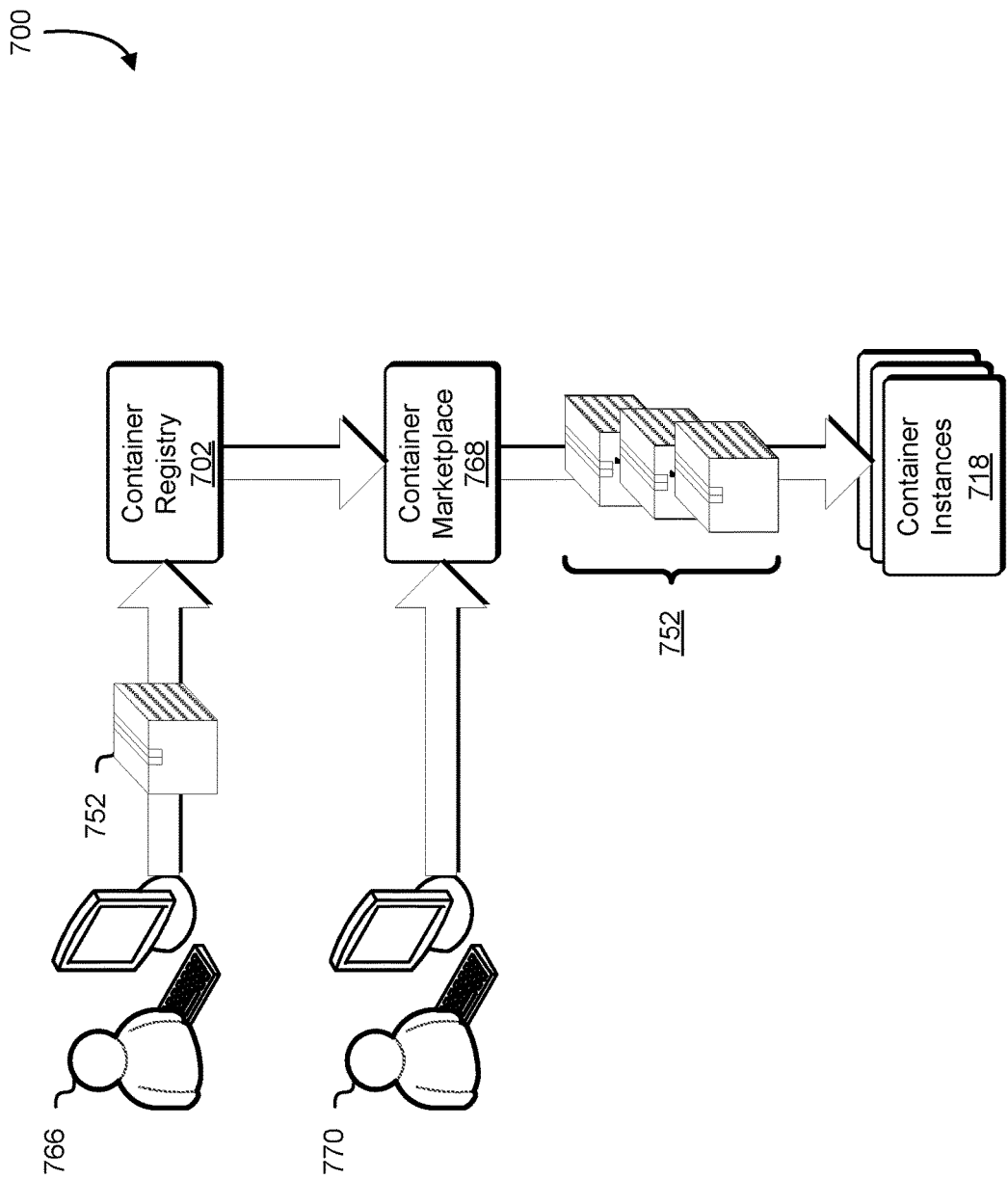
FIG. 7 illustrates an example of a container marketplace for container images in accordance with an embodiment.

FIG. 7 illustrates an example 700 of an embodiment of the present disclosure. Specifically, FIG. 7 depicts using a container registry 702 of the present disclosure, similar to the container registry 202 of FIG. 2, being used in conjunction with a container marketplace 768. As depicted in the example 700, a software vendor 766 may develop and build a software application, and upload the software application as a container image 752 to a global repository in the container registry 702. A global repository, as opposed to a private repository, may allow other users access to download container images from the global repository, such as in exchange for a fee. Such container images in a global repository may be available to for purchase (i.e., transacted) through the container marketplace 768, which may be an online marketplace in the form of a website or other user interface from which licenses for one or more container images may be selected and/or purchased by consumers. The example 700 further depicts a customer 770 who has selected, through the container marketplace 768, the container image 752 stored in the container registry 702, and directed that one or more copies of the container images 752 be downloaded and launched in one or more container instances 718 belonging to the customer 770.

One advantage presented by the example 700 is that because, as noted above, container images of the present disclosure may be stored as layers, the container image 752 may be smaller than a full container image because other components/dependencies of the container image may already reside in the container registry 702, and consequently the container image 752 may only include layers containing differences from the layers already present in the container registry 702. Furthermore, because the container image 752 may be stored as layers, individual layers may be separately priced in the container marketplace 768 thereby providing price flexibility. For example, if the container image 752 comprises an operating system layer developed by a first software vendor, and one or more layers associated with individual software applications developed by a second software vendor, the first software vendor may set a price for the operating system layer, and the second software vendor may set prices for the one or more software application layers. In this manner, the first software vendor may change the price for the operating system layer without involving the second software vendor. Furthermore, if the second software vendor updates one of the software application layers, the customer 770 seeking to update to the new software application may only need to pay for the updated software layer, and need not repurchase the operating system layer or other application layers.

Additionally, because the one or more container instances 718 may be executing under the control of the container service, and being monitored by one or more agents, such as the agent 206 of FIG. 2), metrics about the usage (e.g., processor usage, memory usage, storage used) of the software containers of the container images may be tracked and charged to the consumer on a usage basis rather than or in addition to a per container image basis. For example, the container image 752 may be downloaded and installed to the one or more container instances 718 of the customer 770 without charge by the software vendor 766. However, in this example, the customer 770 may be charged by the usage (e.g., according to metrics such as average processor usage per day, peak memory usage each hour, number of instances/copies being run, combination of any of the above, etc.) of the container image. In this manner, a customer who only uses the software application of the container image 752 intermittently, need not pay as much for the container image 752 as a customer who uses the software application 24 hours per day/7 days per week.

Figure 8:
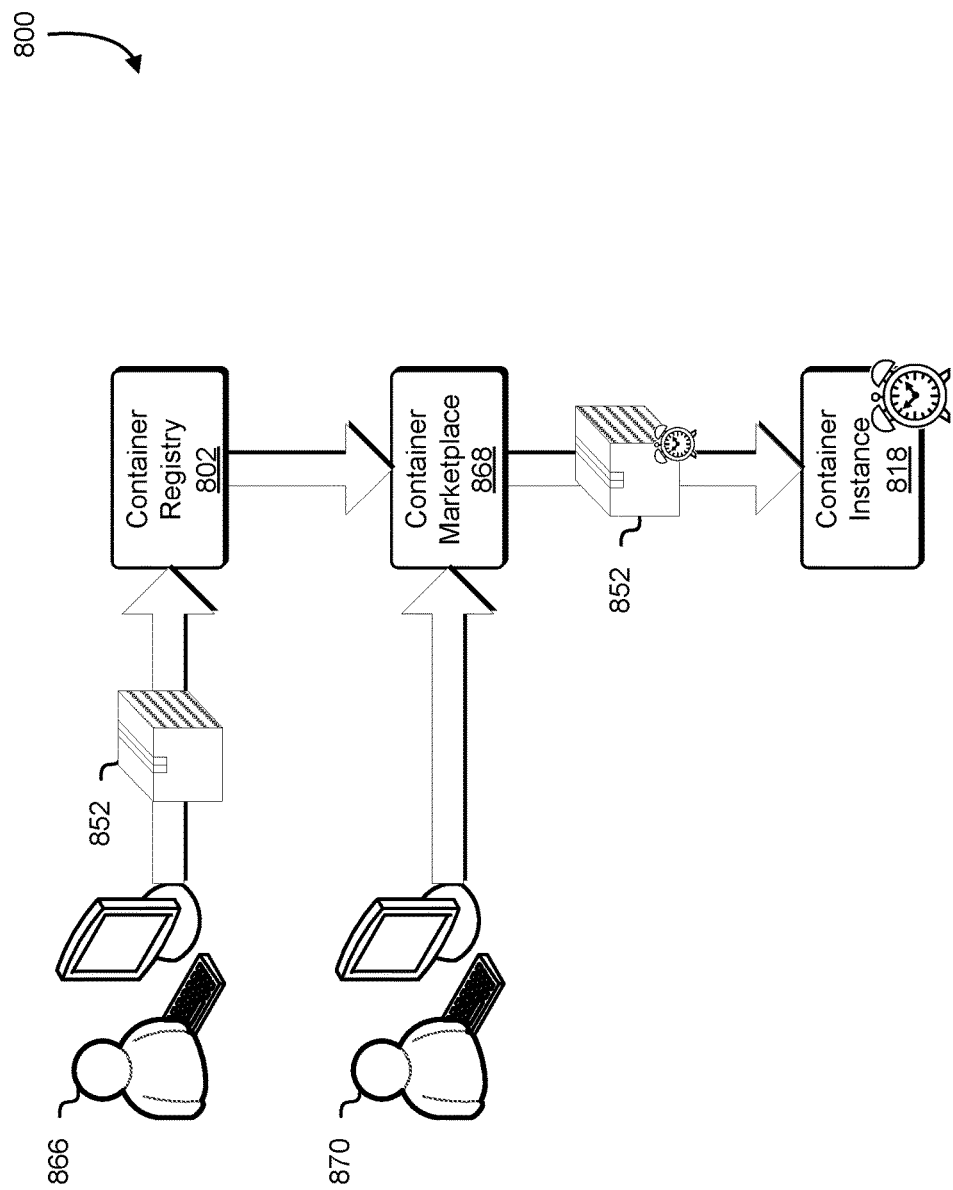
FIG. 8 illustrates an example of container marketplace for time-based container images in accordance with an embodiment.

FIG. 8 illustrates an example 800 of an embodiment of the present disclosure. Specifically, FIG. 8 depicts a container marketplace for purchasing and running time-limited containers. In the example 800, a software vendor 866 uploads a container image 852 to a non-private repository in the container registry 802, making it available for free, purchase, or lease from a container marketplace 868 for a duration of time specified by the software vendor 866. As a result of the duration of time expiring, the running software may be rendered unavailable/inaccessible to the purchaser. For example, the software vendor 866 may be a vendor of a particular operating system (e.g., Red Hat Linux, Microsoft Windows, Apple OS X, etc.). In conjunction with making the operating system available for purchase through the container marketplace 868, the software vendor 866 may specify that, "Purchase of this product entitles the purchaser to run this operating system for three hours." Whereupon, upon purchase of the product by the customer 870 through a user interface for the container marketplace 868, the operating system may be launched and executed as a software container in a container instance 818 of a container service on behalf of the customer 870 for three hours. When the three hours is up, the operating system may be terminated, suspended, or access to the operating system by the customer 870 may be denied, according to the terms of the purchase agreement. In some embodiments, the time limit/duration may be execution time of the software container. In other implementations, additionally or alternatively, the time/limit duration may be an amount of time since purchase or an amount of time since the software container was first launched, irrespective of actual run time (e.g., if the software container is terminated or suspended, the timer does not stop). It should be noted, that the container image 852 may be any type of application (e.g., web hosting service, word processing application, database, etc.). The software vendor 866 may specify various security roles and permissions that the purchasing customer 870 may have in order to utilize the purchased software product. The computing resource service provider providing the container service may deny the customer 870 the ability to utilize a secure shell (SSH) to access the container running the software in order to further prevent potential software piracy of the container image 852.

In this manner, at no point in time can the customer 870 actually download the container image 852 (because the download and installation is performed by the container service on hardware of the container service), thereby providing a degree of piracy protection to the software vendor 866. Furthermore, being time-based provides the software vendor 866 with pricing flexibility. Because the software would be running in a container service, such as the container service described in U.S. patent application Ser. No. 14/538,663, incorporated by reference herein, running time of the software may be accurately tracked, such as by an agent running in the container instance 204, and therefore actual usage of the software by the customer 870 may be determined and the software may be caused to expire at the end of the duration specified by the license agreement of the product purchased by the customer 870.

The container marketplace 868 may also permit the bundling of different container images. For example, if the customer 870 desires to run WordPress for two hours and store the WordPress information in a MySQL database, the customer may select a WordPress container image and a MySQL container image from the container marketplace 868, select a run duration, run each of those container images in separate, but linked, software containers (e.g., configured to accept the same ports, and so on), and then after the duration is over, the containers may terminate, suspend, or other action as defined by the software vendor 866.

The time limit may be enforced in a variety of ways. In one implementation, upon launching the software of the container image 852 in the container instance 818, a notification indicating an expiration time for the software will be sent to a timer service (not pictured) that will, upon reaching the expiration time call back to the container instance 818 with an instruction to terminate the container running the software. Once terminated, the container instance 818 and/or the container service may free up the resources that were being used by the software container. In some embodiments, the container marketplace 868 allows the customer 870 to add time to the running duration of the software. For example, if the customer 870 purchased license to run the software of the container image 852 for two hours, and after the first hour the customer 870 realizes he/she wishes to run the software for an additional three hours, the customer 870 may purchase an additional three hours of run time for the software through the container marketplace 868.

In another implementation, blocks of run time can be purchased for a set of running software containers based on the container image 852. In other words, an aggregation of the running time of concurrently-running software in the cluster of container instances may be deducted from the purchased block of time (e.g., two container instances each running the deployed software for one minute, deplete the allotted time by two minutes). That is, the customer 870 may purchase a 1,000 hour block of time for software associated with the container image 852 launched and running in 100 different software containers; that is, the 100 different software containers may be running in parallel, but may not all be running at the same time (e.g., new software containers may be launched as demand increases and software containers may be terminated as demand decreases). Once the set of 100 different software containers have cumulatively used up the 1,000 hour block of time, the 100 software containers may be terminated together. In some cases a customer 870 may purchase a first software package (e.g., a software application for processing data) on a time basis, and a second software package (e.g., database application) having no expiration, configured to interact with the first software package. In this manner, the first software package can process data for the purchased duration, store the processed data using the second software package, and upon expiration of the first software package, the process data is still persisted by the second software package.

As noted, upon the expiration of the allotted time, other actions may be taken by the computing resource service provider rather than termination of the running software containers. For example, the state of the software container at the time of the expiration may be stored in a data store or other persistent storage at least temporarily, and if the customer 870 chooses to purchase additional time, the software container may be relaunched to continue execution from the state it was in prior to the expiration using the stored state. Similarly, a snapshot of the software container could be taken at the time of expiration, and if the customer chooses to purchase more time, the software container may be relaunched from the snapshot.

Figure 9:
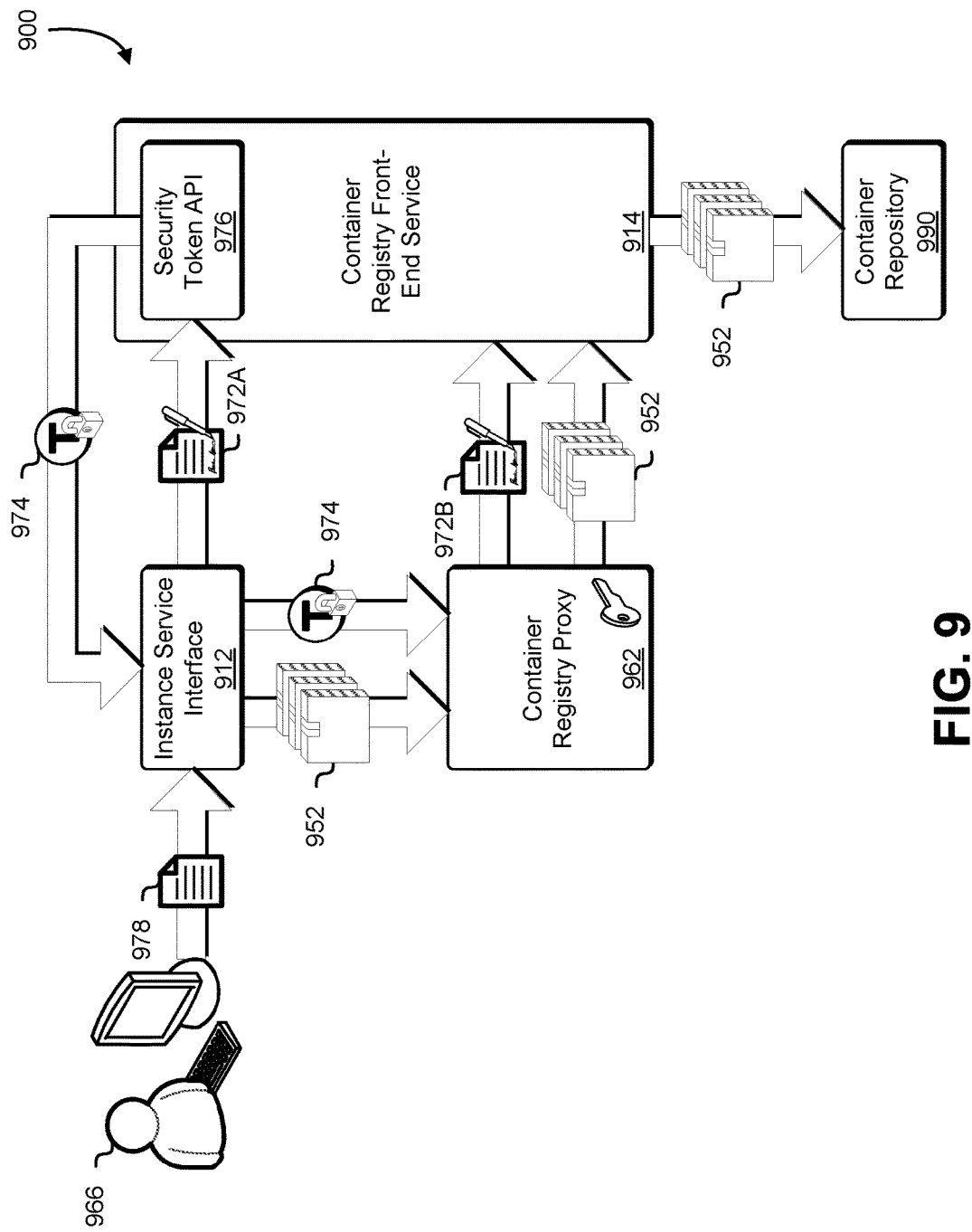
FIG. 9 illustrates an example of token-based authentication for container images in accordance with an embodiment.

FIG. 9 illustrates an example 900 of an embodiment of the present disclosure. Specifically, FIG. 9 depicts using token-based authentication with a container registry of the present disclosure, such as the container registry 202 of FIG. 2. In the example 900, a software developer 966 seeks to build and upload a container image 952 to a container repository 990 of the software developer 966. A container image 952 may be comprised of a set of layers, and, during an upload (also referred to as a "push"), requests may be made to determine whether individual layers of the set of layers have already been uploaded. Each of these requests may include a determination whether the entity making the request is authorized to do so.

This authorization workflow is displayed in the example 900. In the example, the software developer 966 makes a request to an instance service interface 912, such as the instance service interface 212 of FIG. 2, for a security token 974. The request may include credentials or proof of credentials 978 (e.g., username/password, biometric identifying information, one-time passcode, a cryptographic hash of any or all of the aforementioned data, etc.) usable to authenticate the software developer 966.

The credentials or proof of credentials 978 may be exchanged for the security token 974. The security token 974 may operate as a request token (e.g., may be used for a certain number of requests and/or until such time as the security token 974 expires), similar to a session-based token. The security token 974 may include the credentials or proof of credentials 978 in encrypted form. In some implementations, the security token 974 may include additional information, such as an expiration time, in encrypted form. To perform the exchange of credentials or proof of credentials 978 for the security token 974, the instance service interface 912 may provide a first signed request 972A to a security token application programming interface 976 in a request for the security token 974. The first signed request 972A may include the credentials or proof of credentials 978 and may be signed using a derived key that has been derived from a shared key held by the container registry front-end service 914 in a manner similar to the derivation of derived keys described in U.S. patent application Ser. No. 13/248,953, incorporated by reference herein, such that the security token application programming interface 976 can verify the first signed request 972A.

Upon authenticating the credentials or proof of credentials 978 and verifying that the signature in the first signed request 972A is valid, the security token application programming interface 976 may generate the security token 974. As noted, the security token 974 may be the credentials or proof of credentials 978 that are encrypted such that that the security token 974 may be decrypted by a cryptographic key held by the container registry proxy 962 that is not shared; for example, the container registry proxy 962 may have a private key of a public-private key pair, and the security token 974 provided by the security token application programming interface 976 may be encrypted using a public key of the public-private key pair.

The security token 974 may be passed to the software developer 966 and/or the instance service interface 912. The security token 974 may include a signature of the security token application programming interface 976 and/or the instance service interface 912 certifying the authenticity of the security token 974. Once the security token is received by the software developer 966, subsequent commands passed to and by the instance service interface 912 need only include the security token 974, rather than the credentials or proof of credentials 972 as proof that the software developer 966 is authorized to have certain requests fulfilled, thereby presenting less risk of the credentials or proof of credentials 978 being compromised. As noted, the security token 974 may be preconfigured with certain restrictions, such as permissions and/or expiration dates, by encrypting the restrictions into the security token 974. In this manner, restrictions can be readily checked by the container registry proxy 962 simply by decrypting the security token 974, while simultaneously preventing unauthorized entities (e.g., those without a key usable to decrypt the security token 974) from accessing the data (e.g., permissions, expiration dates, credentials, etc.) encrypted into the security token 974. Thus, the security token 974 may be used for various requests as proof of authentication to the container registry front-end service 914 for as long as the security token 974 remains valid.

Thus, subsequently, the instance service interface 912 may pass the security token 974 to the container registry proxy 962 for each layer of the software image being uploaded by the software developer to the container repository 990. The container registry proxy 962 may decrypt the token to obtain the credentials or proof of credentials 978. Also encrypted within the security token 974 may be restrictions, such as time limits on the security token 974 (e.g., a time duration after which the security token expires, a number of times that the security token may be used, etc.). Thus, the container registry proxy 962 may authenticate the credentials or proof of credentials 978, determine whether the token is still valid, and, if so, may provide the credentials or proof of credentials to the container registry front-end service 914 in a second signed request 972B. The second signed request 972B may be signed using the same or different derived key derived from the shared key held by the container registry front-end service 914, as described above. Note that, if the token is determined not to be valid (e.g., expired), the container registry proxy 962 may return an error to the software developer 966 (e.g., "This token is no longer valid; you must re-authenticate.").

As shown in the example 900, the software developer pushes the layers (including the manifest) of the container image 952 and the security token 974 in application programming interface requests to the container registry front-end service 914. A container registry proxy 962 intercepts the requests and the security token 974, decrypts the security token 974 as needed using a cryptographic key it maintains as a secret, and verifies that the security token 974 is valid.

Verification/authentication of the security token 974 includes verifying that the credentials or proof of credentials 978 extracted from the security token 974 match valid credentials of the software developer 966, and that any limitations/restrictions on use of the security token 974 (e.g., expiration times, number of uses, etc.) have not been exceeded, and so on. If the security token 974 is invalid, the container registry proxy 962 may return an error to the software developer 966 indicating that the token is invalid and/or has expired, and that the software developer must re-authenticate with the credentials or proof of credentials 972 in order to proceed.

However, if the security token 974 is valid, the container registry proxy 962 determines/derives a signing key, as described above, based on the security token 974, and sends a second signed request 972B and the layers of the container image 952 to the front-end service 914 as if the container registry proxy 962 were, itself, the software developer 966. The container registry front-end service 914 may verify the second signed request 972B, determine whether individual layers of the layers of the container image 952 have already been stored in the container repository 990, and upload the layers that have not already been stored in the container registry 990 as the container image 952. Note that a similar process would follow if the software developer 966 took action to download a container image from the container registry 990 as well or instead. That is, while the process described above may be applied to uploading a software image to the container repository 990, the same process (i.e., obtaining the security token 974 from which the credentials may be extracted by the container registry proxy 962, and so on) may be utilized for a customer who requests that a software image be downloaded or launched into container instances, such that the security token 974 can provide proof that the software developer 966 is authorized to have certain requests fulfilled, without having to provide the credentials or proof of credentials 972.

Figure 10:
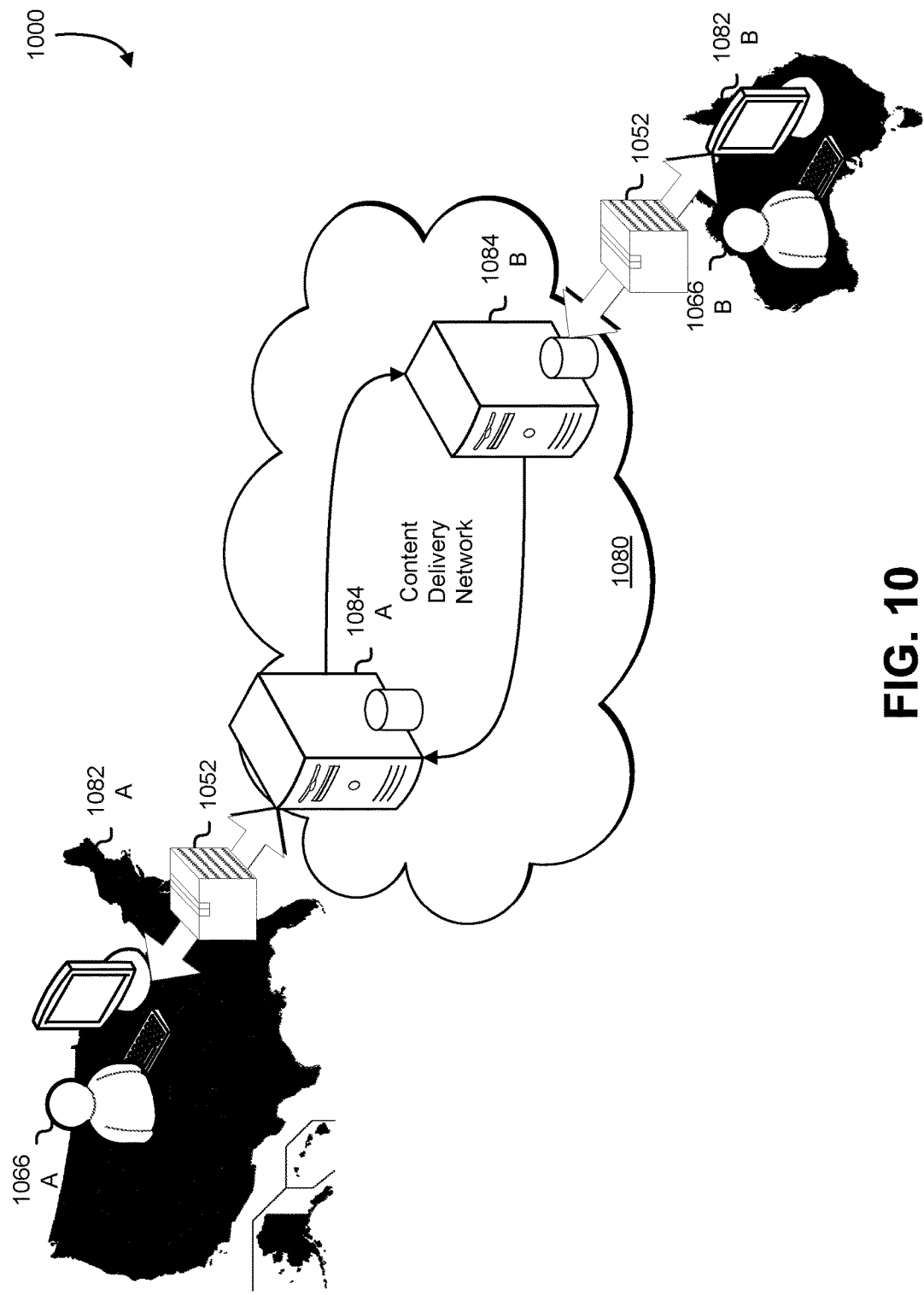
FIG. 10 illustrates an example of predictive container registry caching in accordance with an embodiment.

FIG. 10 illustrates an example 1000 of an embodiment of the present disclosure. In embodiments of the present disclosure, container registries can be physically located on servers in different geographic regions in order to provide faster uploading and downloading of container images. That is, each of the servers 1084A-84B may have a local container registry for customers/developers located in that region, and container images may be cached based on previous usage of container images by the customer/developer and/or resource needs of the container image. Specifically, FIG. 10 depicts a content delivery network 1080 configured to make container images stored in container repositories of the present disclosure, such as the container registry 202 of FIG. 2, available to multiple geographic regions so that customers in those regions are quickly able to upload, download, and otherwise access those container images. In some cases, the ability to deliver the container images may be offered by a computing resource service provider to customers for an additional fee.

In the example 1000, a software developer 1066A in a first geographic region 1082A may upload a container image 1052 to a first data server 1084A of the content delivery network 1080 located in the first geographic region 1082A. The content delivery network 1080 may be a distributed system of servers deployed in multiple geographic regions in around the world, communicating with each other via a network, such as the Internet. The content delivery network 1080 may host content (e.g., software images) on the servers throughout the various geographic regions by copying the content from a server in one geographic region to a server in another geographic region. Customers of the computing resource service provider realize a benefit by being able obtain content more quickly from the servers most geographically proximate to the customer. The content delivery network 1080 can then provide the container image 1052 to a second data server 1084B of the content delivery network 1080 located in a second geographic region 1082B of a customer 1066B. In this manner, the customer 1066B, by being able to download the container image 1052 from a server in the same geographical region, the customer 1066B is able to receive the container image 1052 more quickly than downloading the container image 1052 from the first server 1044A located in the first geographic region 1082A.

The example 1000 further contemplates intelligent caching of container images. For example, if the customer 1066B has 1,000 container instances running a first version of the container image 1052 on servers in the second geographical region 1082B, the system of the present disclosure may predict that if the software developer 1066A ever updates the container image 1052, then it is likely that the customer 1066B will soon wish to update the 1,000 container instances to the new version of the container image 1052. In preparation for this event, the system of the present disclosure may cache one or more layers, or as many as may be needed to update the container instances, in local memory or fast persistent storage of servers in the second geographical region 1082B. In this manner, the customer 1066B can quickly deploy the new version of the container image 1052 to the container instances. In some implementations, the system is configurable such that the system may automatically update the container instances of the customer 1066B in the second geographical region 1082B with the new version of the container image 1052 as a result of the new version being made uploaded to the first data server 1084A. Because the container image 1052 may be comprised of layers, and the update may only involve updating a few layers (rather than all of the layers of the container image 1052), the amount of data stored in cache for the update may be much smaller than caching the entire container image 1052.

One method of predictive caching may be based on historical deployments of container images from the same repository. For example if the customer 1066B has, at a previous time, uploaded a container image and subsequently downloaded/launched that container image in five container instances, and if, at another previous time, the customer 1066B uploaded another container image and subsequently downloaded/launched that container image five container instances again, the system of the present disclosure, upon detection that the customer 1066B has again uploaded a container image, may predict that the customer 1066B will next want to download/launch that container image into the five container instances and may cache that container image in preparation for subsequent deployment. Note that predictive caching need not be restricted to embodiments utilizing a content delivery network; that is, image layers may be cached based at least in part on previous deployment activity with container instances hosted by computer systems located in a same region as the repository.

Similarly, the system of the present disclosure may track the container image that is downloaded and launched by customers, and may track, such as via an agent like the agent 206 of FIG. 2 or via scheduler of the type described in in U.S. patent application Ser. No. 14/538,663, incorporated by reference herein, which software applications are currently running container instances, when they run, and how often they are run. Using this data, the system may predict that if an update is made to a container image corresponding to a long-running (e.g., the application corresponding to the container image runs continuously, on average, for multiple days or some other threshold period) and/or frequently-running application (e.g., the application corresponding to the container image is launched, on average, multiple times per day, or some other threshold frequency), that the updated container image or the particular container image layers corresponding to the application should be cached in preparation of an update to the long running and/or frequently running application. If previous history indicates that the customer 1066B typically performs deployment at a particular time of day or day of week (e.g., midnight on Saturday), intelligent caching may make efficient use of memory resources by only loading the layers necessary for the deployment just in time (JIT) for (e.g., one minute prior to deployment time) the predicted deployment time. Caching strategies additionally or alternatively could include a least-recently used caching (LRU) strategy, a hit-based strategy, pre-fetching, and various combinations of strategies described above. Note that it is contemplated that various other cache optimization strategies alternative or in addition to those described may be used.

Figure 11:
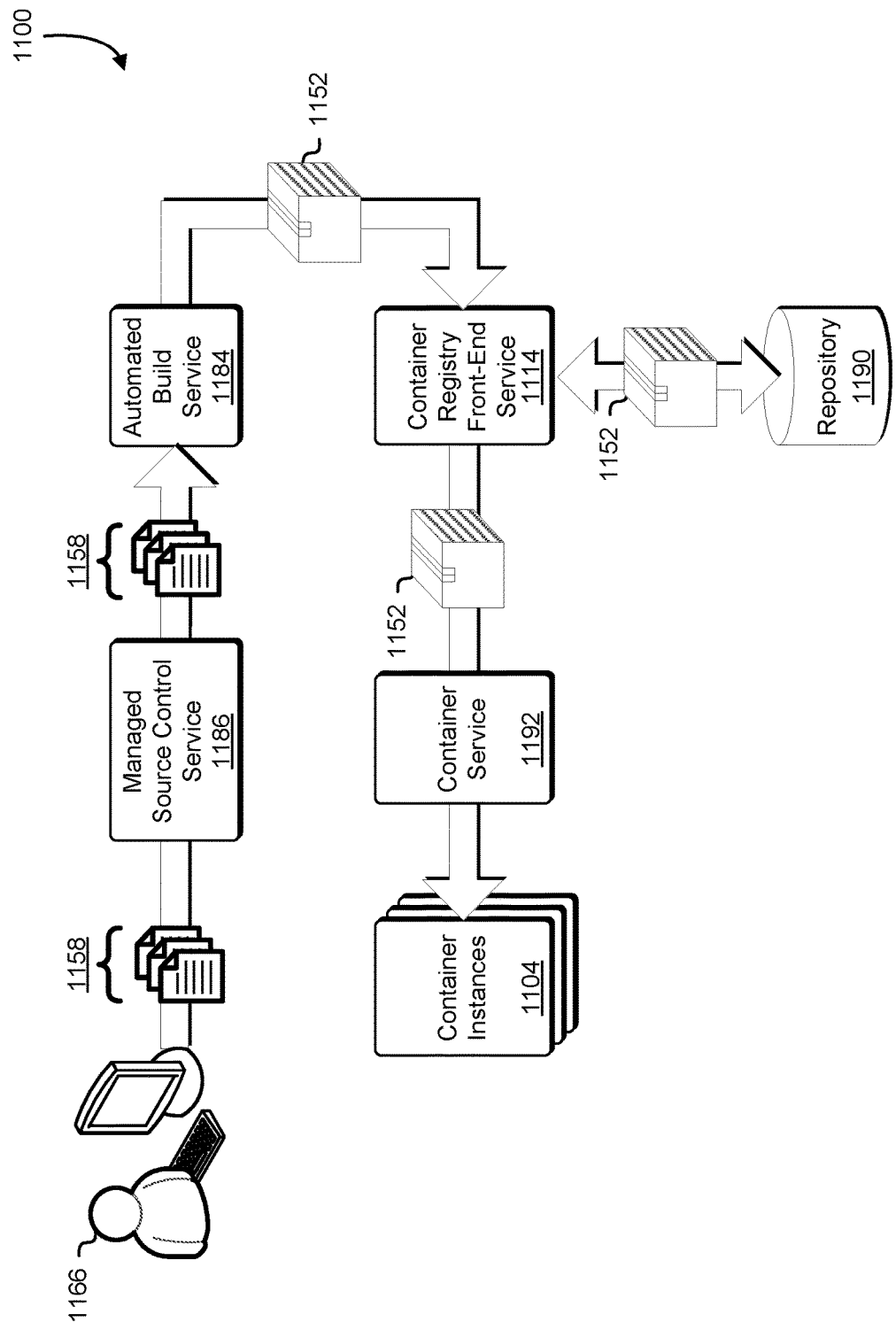
FIG. 11 illustrates an example of an automatic build and deployment service in accordance with an embodiment.

FIG. 11 illustrates an example 1100 of an embodiment of the present disclosure. Often, container images are built according to instructions in a specialized text file written in a certain prescribed syntax. Types of such files are makefiles, Dockerfiles, and so on, referred to in the present disclosure generally as "build files." Building a container image may involve executing such text files. FIG. 11 depicts an automated build and deployment service whereby customers can upload files to the managed source control service 1186 and an automated build service 1184 will perform the operations to build the container image from the uploaded files. In the example 1100, a customer 1166, uploads a set of build artifacts 1158, including the build file for the set of files, via an application programming interface of the managed source control service 1186. The managed source control service 1186 forwards the set of build artifacts 1158 to the automated build service 1184 builds the container image 1152 in accordance with the build file and the container engine type that the set of build artifacts 1158 have been configured for or specified as, and stores the container image 1152 in repository of the customer 1166 in the container registry 1102.

In some embodiments, the managed source control service 1186 may be a version control service hosted by the computing resource service provider of the container service that allows customers to store and manage build artifacts, such as documents, source code, and binary files in customer repositories. The set of build artifacts 1158 may be information useable to build a software container. Consequently, the set of build artifacts 1158 may include one or more of a configuration file, makefile, a source code file, a data file, a binary file, and other resources and instructions needed to build and/or deploy and/or test a container image.

In other embodiments, the managed source control service 1186 may be an application installed by the customer 1166 onto a server under the control of the customer 1166. In still other embodiments, the managed source control service 1186 may be provided by different computing resource service provider from the computing resource service provider hosting the container service 1192. In some implementations, the repositories may be encrypted. The managed source control service 1186 may provide a user interface and/or application programming interfaces for creation and management of a customer's repositories by the customer 1166. In embodiments, the customer 1166 may have already uploaded the set of build artifacts 1158 to the managed source control service 1186 and may need only upload a build artifact that indicates the location of a code repository with the managed source control service for the set of build artifacts 1158 needed to automatically build and deploy the container image 1152.

In some embodiments, the automated build service is configurable to perform rolling deployments and rollbacks. For example, the automated build service 1184 may communicate with a scheduler, such as a scheduler of the type described in in U.S. patent application Ser. No. 14/538,663, incorporated by reference herein, to deploy a new version of a container image to a predetermined percentage or number of container instances at a time, only deploying the new version to the next predetermined percentage or number of container instances if the previous deployment was successful. This process may continue until an entire fleet of container instances is updated to the new version of the container image. However, if an attempt to deploy the new version to a predetermined percentage or number of container instances is unsuccessful, the automated build service 1184 may automatically reverse course and roll back newly updated container instances to the previous software version. In this manner, software deployments may be rolled forward or rolled back one portion at a time.

For example, the Docker container engine uses a descriptive file format, called a Dockerfile, that allows users to build Docker images. In this example, the customer 1166 may be working on an update to a software application. The customer 1166 may build and test the updated source code locally. When the customer 1166 is satisfied that the updated source code is ready to be packaged up and deployed, the customer 1166 may provide the source code and the build file as the set of build artifacts 1158, and the automated build service 1184 may automatically build new versions of the container image from the set of build artifacts 1158 provided and cause the container registry front-end service 1114 to store the new version in a repository 1190 of the customer. In some embodiments, the automated build service is further configured to automatically deploy the new version of the container image to container instances of the customer 1166 and upgrade currently running previous versions of this container image in those container instances.

For example, the customer may upload the set of build artifacts 1158 to the container registry front-end service, whereupon the automated build service 1184 may build and cause the container registry front-end service 1114 to communicate with a scheduler (e.g., via an application programming interface) to deploy the updated container image 1152 from the repository 1190 to a container service 1192 of a computing resource service provider, such as the container service described in U.S. patent application Ser. No. 14/538,663, incorporated by reference herein. The container service may be a service comprising a collection of computer resources provided to a customer by a computing resource service provider and configured to instantiate containers on behalf of a customer. The container service 1192 may cause the updated container image 1152 to be launched in one or more container instances 1104 in accordance with a deployment strategy defined/specified by the customer 1166 (e.g., strategy that effectively instructs the automated build service 1184 to, "each time a new version of this software is uploaded, roll out the software in this predefined manner").

In some cases, building and deploying may include building the software image from files stored with the managed source control service 1156. In other cases, the source code files may be precompiled into binaries within the managed source control service 1156 and building and deploying may involve copying the precompiled binaries to a destination container.

For embodiments of the present disclosure, various deployment schemes are contemplated. For example, one deployment scheme may be stop the old versions of running software, and then launch the updated version of the software. As another example, a rolling deployment (such as was described above) may be desirable in some implementations. One example of a rolling deployment may be a serial deployment; that is one instance of a running old version of the software is stopped and the new version of the software is launched for the instance, before the deployment moves on to the next instance having a running old version of the software. Still another deployment strategy may be a blue-green deployment, where the new version of the software is installed in container instances in a test network running in parallel with a production network (i.e., hosting the container instances running old version of the software), and when the new software is fully installed, switching the test network to be the production network and taking the old production network off-line. In some implementations, the system of the present disclosure provides functionality for a customer to be able to define the customer's preferred deployment scheme, such as in a JSON document that specifies which applications to update and how the customer wants them to be updated.

Figure 12:
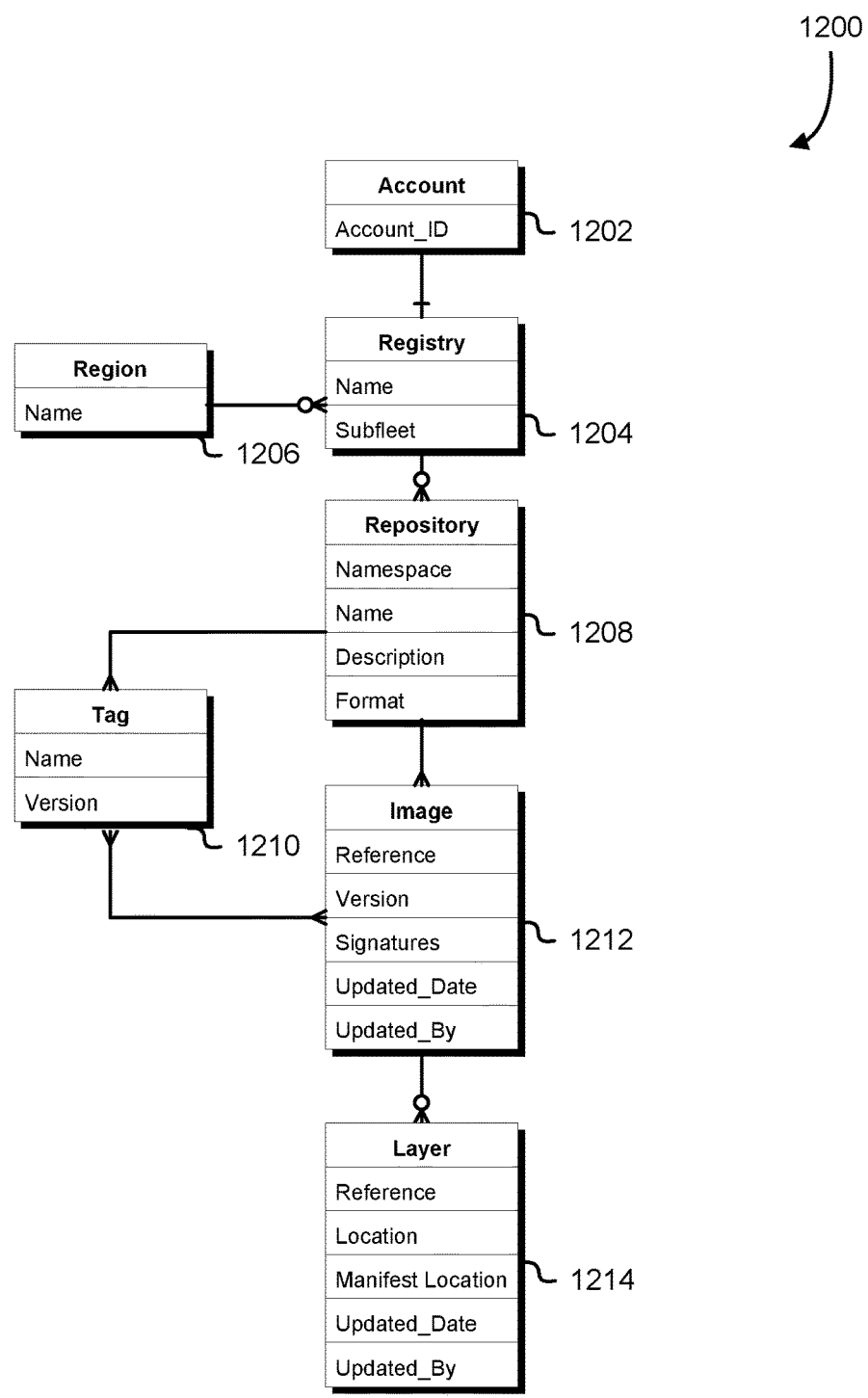
FIG. 12 illustrates an example of an entity relationship diagram of a container registry in accordance with an embodiment.

FIG. 12 illustrates an entity relationship diagram 1200 of a container registry of an embodiment of the present disclosure. As can be seen in FIG. 12, the container registry may comprise a set of container registries allocated to different sub-fleets. The account may relate to a given customer of a computing resource service provider, and may have a one-to-one correspondence with the container registry 1204. The region 1206 may refer to a location of the repository, which may be a physical location, a location within a data center, or a virtual location. The region 1206 may have a zero-to-many correspondence with the registries. Each container registry 1204 may correspond to a set of zero-to-many repositories 1208, which may be owned by a given account. The repositories 1208 are locations for uploading container images 1212, namespace optional, in the manner described in the present disclosure. Hence, the repository 1208 has a one-to-many correspondence to the container images 1212 stored at that location. The tag 1210 may be a mutable pointer to a container image 1212 for conveniently referring back to that container image 1212. Thus the repository 1208 may have a many-to-many correspondence to the tags 1210, which in turn may have a many-to-many correspondence with the container images 1212. As described in the present disclosure, each container image 1212 may be made up of a set of files and a manifest known as layers 1214. Consequently, as can be seen, the image 1212 has the zero-to-many correspondence to the layer 1214.

Figure 13:
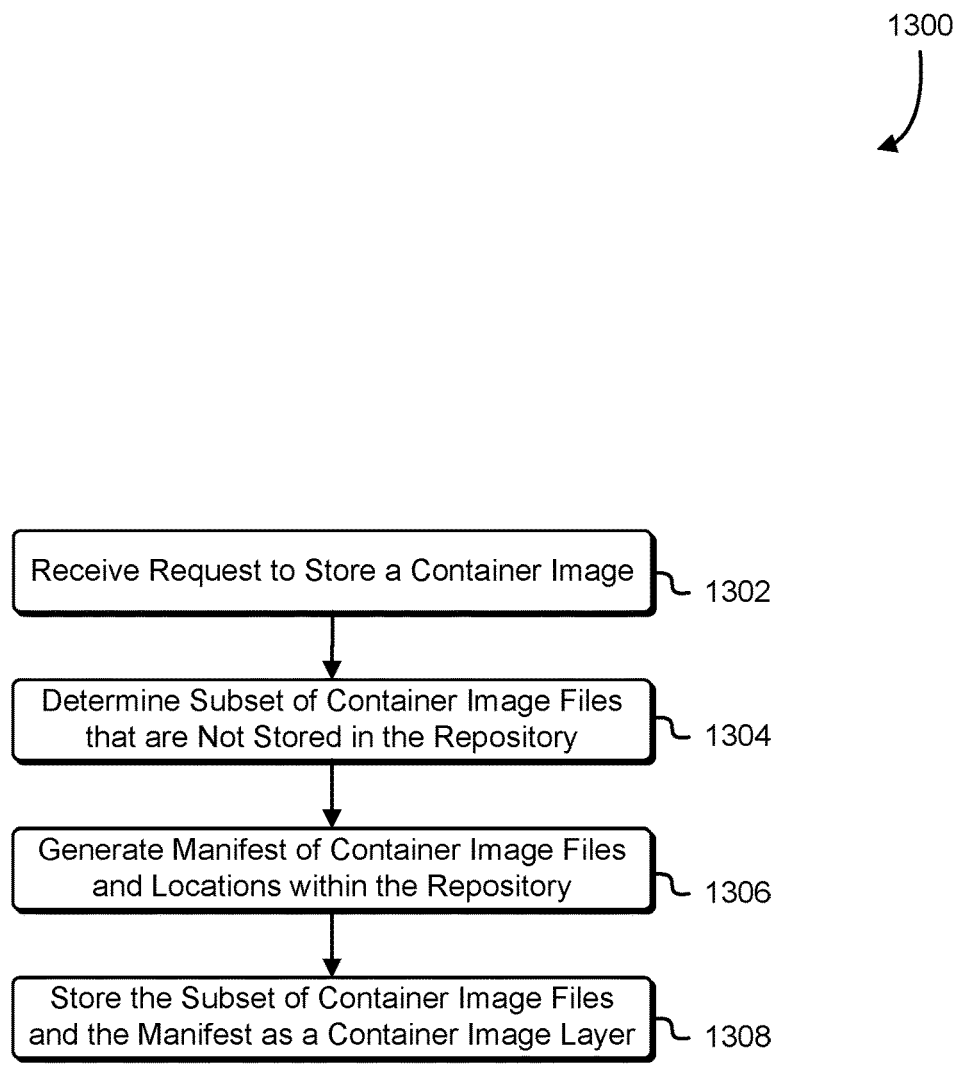
FIG. 13 is a block diagram that illustrates an example of storing a container image in accordance with an embodiment.

FIG. 13 is a block diagram illustrating an example of a process 1300 for storing a container image in a repository in accordance with various embodiments. Some or all of the process 1300 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 17:
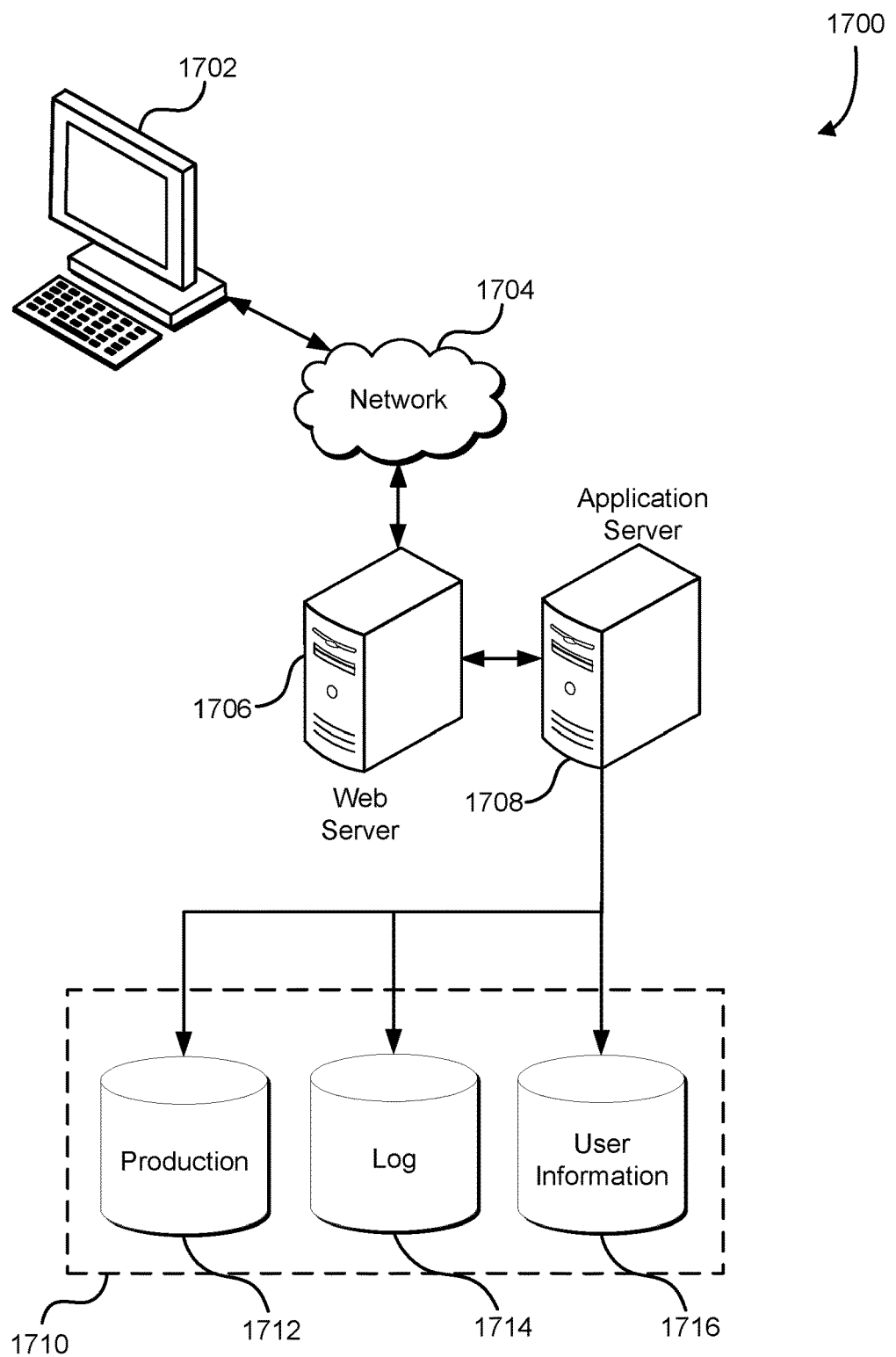
FIG. 17 illustrates an environment in which various embodiments can be implemented.

For example, some or all of process 1300 may be performed by any suitable system, such as a server in a data center, by various components of the environment 1700 described in conjunction with FIG. 17, such as the web server 1706 or the application server 1708, by multiple computing devices in a distributed system of a computing resource service provider, or by any electronic client device such as the electronic client device 1702. The process 1300 includes a series of operations wherein a request is received to store a software image, a set of layers are determined to be stored for the container image, a manifested generated, and the layers in the manifest are stored as the container image.

In 1302, a request is received, such as through the container registry front-end service 114 of FIG. 1, to store a container image. The container registry be comprised of a set of repositories, each assigned to a customer of a computing resource service provider. As described in the present disclosure the request may be received from any of a variety of entities, such as from a computing device being operated by the customer associated with the repository, and automated build service, such as the automated build service 1184 of FIG. 11, or some other entity authorized by the customer associated with the repository. The request may indicate the container image being uploaded and may include credentials or an authentication token, such as the security token 974 of FIG. 9.

In 1304, the system may analyze the indicated container image to determine a set of layers, which may be a subset of image files of the container image. The system may determine, based on information received with the request of 1302, whether the container image is an update to a container image already stored in the repository of the customer or whether the container image is a new image being stored in the customer repository. The system may determine which of the layers have not previously been stored in the customer repository (or, in some implementations, a global repository), and determined to only store those layers not previously stored in the customer repository. In some embodiments, the determination of which layers have not been previously stored in the customer repository is made querying data stored in a registry metadata storage service, such as the registry metadata service 222 of FIG. 2.

In 1306, a manifest may be generated for the subset of layers representing the container image being uploaded. As noted, the manifest can be comprised of metadata about the container image as well as metadata about the set of layers of which the container image is comprised. In this manner, the manifest specifies which layers are associated with the container image, and thus, when a new container image is uploaded, it can be determined from the manifest, which layers of the image may or may not already be stored in the customer repository. In 1308, the subset of layers determined in 1304 may be stored with the manifest, such as in a data structure similar to the one described in conjunction with FIG. 12. Note that one or more of the operations performed in 1302-08 may be performed in various orders and combinations, including in parallel.

Figure 14:
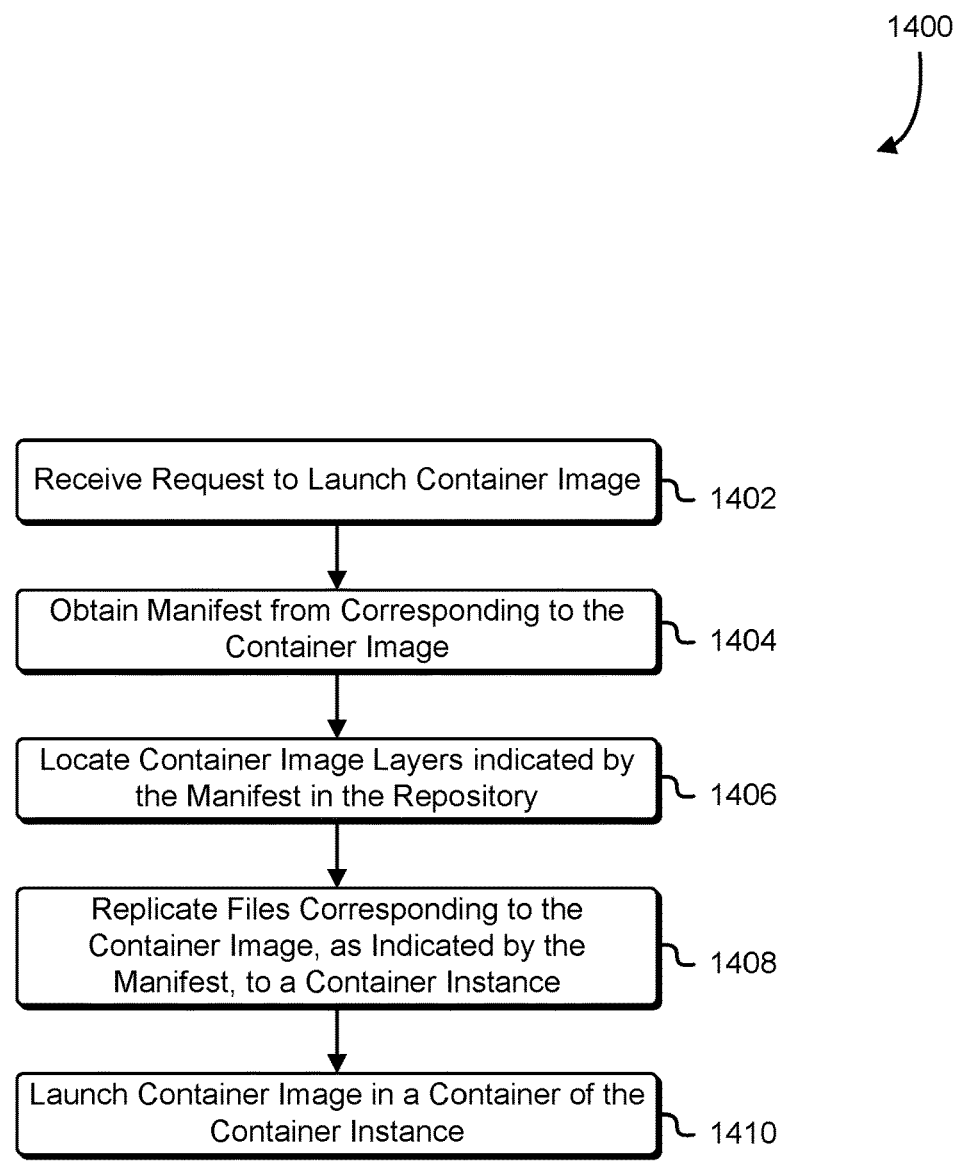
FIG. 14 is a block diagram that illustrates an example of launching a container image stored in a repository in accordance with an embodiment.

FIG. 14 is a block diagram illustrating an example of a process 1400 for causing a container image stored in a repository to be launched in accordance with various embodiments. Some or all of the process 1400 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1400 may be performed by any suitable system, such as a server in a data center, by various components of the environment 1700 described in conjunction with FIG. 17, such as the web server 1706 or the application server 1708, by multiple computing devices in a distributed system of a computing resource service provider, or by any electronic client device such as the electronic client device 1702. The process 1400 includes a series of operations wherein a request is received to launch the container image, the manifest for the requested container image is located, the layers comprising the container image are located based on the manifest, the container image is downloaded to a container instance, in the container image is launched in a software container of the container instance.

In 1402, the system receives a request (e.g., through the container registry front-end service 114 of FIG. 1) to launch a specified container image. As described in the present disclosure the request may be received from any of a variety of entities, such as from a computing device being operated by the customer associated with the repository, and automated build service, such as the automated build service 1184 of FIG. 11, a container marketplace, such as the container marketplaces 768 and 868 of FIGS. 7 and 8, or some other entity authorized by the customer associated with the repository. The request may indicate the container image being uploaded and may include credentials or an authentication token, such as the security token 974 of FIG. 9.

In 1404, a manifest for the specified container image may be obtained. In some embodiments, this manifest is obtained from a registry metadata storage service, such as the registry metadata service 222 of FIG. 2. In other implementations, the manifest is obtained from the container registry. Based on the metadata in the manifest, in 1406, the layers comprising the container image may be located; that is, because only layers that have been updated may be uploaded with a most recent version of the container image, not all layers comprising the container image may be located together. In some cases, the manifest may provide locations where other layers may be located. In other cases, the manifest may include a content-addressable identifier associated with the other layers, and the location of the other layers may be located using the content-addressable identifier.

Once all of the layers corresponding to the container image are located, in 1408, the container image may be downloaded to a container instance of the customer. In some cases, a container instance may be unavailable, and in such cases, a new container instance may be instantiated for the purpose of launching and running the software of the container image in a software container. In some cases, a task definition file may specify an amount and type of resources to allocate to a container for running the software of the container image, and a container instance may be selected based on the available resources of the container instance and a selection scheme optimized for efficient resource allocation.

Finally, in 1410, the container image may be launched as a running software container in the selected container image. The software container may continue to run as long as desired by the customer, or, as has been described in the present disclosure, may expire and terminate or suspend after a predetermined duration of time. Note that one or more of the operations performed in 1402-10 may be performed in various orders and combinations, including in parallel.

Figure 15:
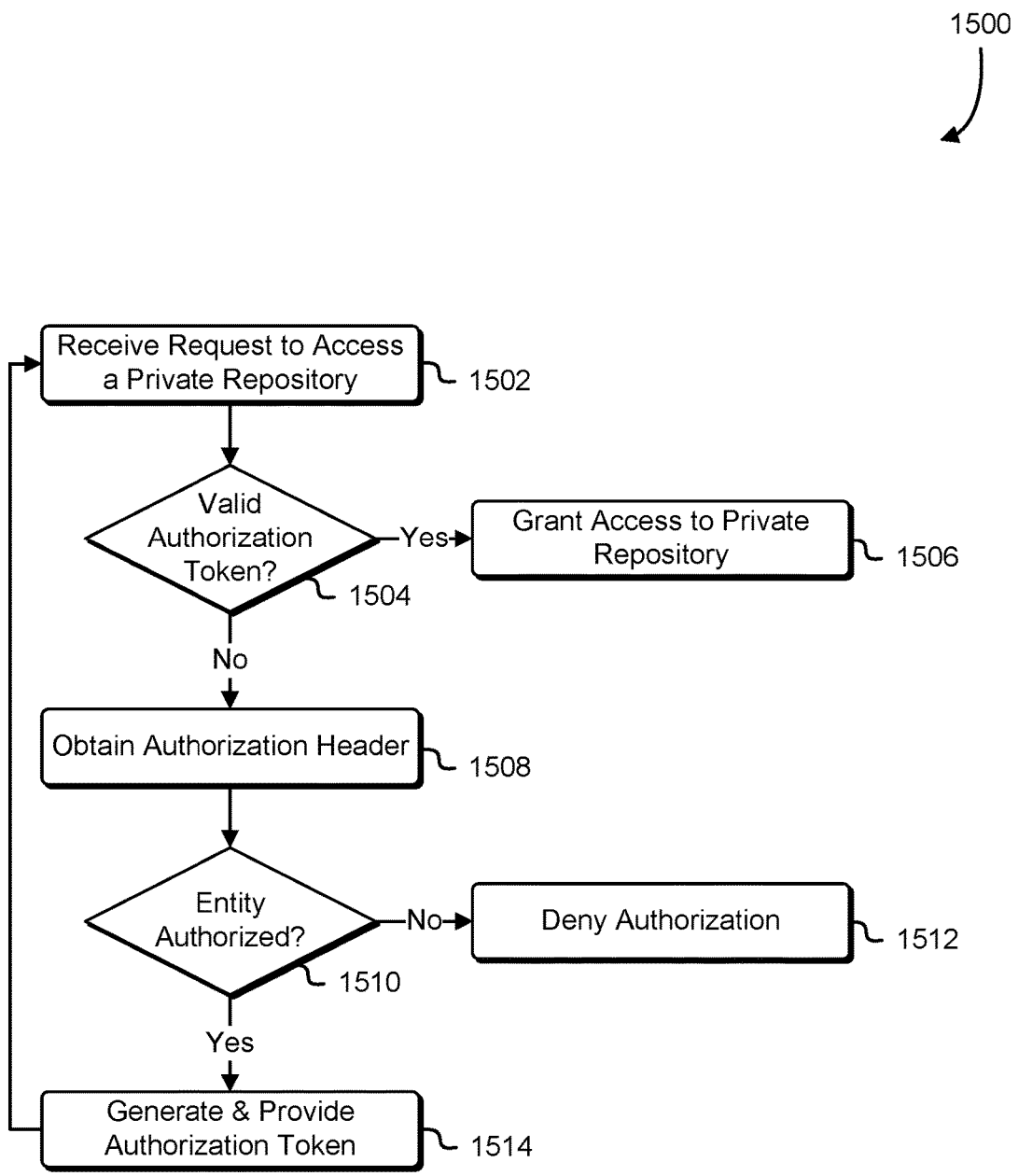
FIG. 15 is a flowchart that illustrates an example of accessing a repository in accordance with an embodiment.

FIG. 15 is a flowchart illustrating an example of a process 1500 for accessing a repository in accordance with various embodiments. Some or all of the process 1500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1500 may be performed by any suitable system, such as a server in a data center, by various components of the environment 1700 described in conjunction with FIG. 17, such as the web server 1706 or the application server 1708, by multiple computing devices in a distributed system of a computing resource service provider, or by any electronic client device such as the electronic client device 1702. The process 1500 includes a series of operations wherein a request is received to access the repository, a determination is made whether the requester has a valid authorization token. If so, access to the repository may be granted. If not, another determination is made whether the requestor is authorized to have the request fulfilled, and, if so, an authorization token may be provided and access to the repository may be granted.

In 1502, the system performing the process 1500 may receive a request from a client (e.g., a client device) to access (e.g., download from, upload to, delete from, list images stored in, search the contents of, etc.) a repository assigned to a customer of a computing resource service provider. In 1504, if the request includes an authorization token, the system performing the process 1500 may determine whether the authentication token is a valid authentication token that indicates the requesting entity should have access to the repository. Validation of the authentication token may be performed, by, for example, decrypting a set of credentials from the authentication token and verifying that the set of credentials are associated with an entity authorized to have the request received in 1502 to be fulfilled. If the authorization token is successfully validated, the system performing the process 1500 may proceed to 1506, whereupon the requesting entity is provided access to the specified repository.

Otherwise, if the request does not include a token indicating that the requesting entity is authorized to access the repository or if the token provided is invalid (e.g., the token has expired, the token has been tampered with or corrupted, the token is the token for a different repository, etc.), the system performing the process 1500 may proceed to 1508, whereupon the requesting entity may be presented with an error message (e.g., "Unauthorized Access," etc.) and/or with an interface to provide credentials (e.g., username and password, multi factor authentication, etc.) as required to determine whether the requesting entity is authorized access the repository. This credential information may be encapsulated in an authorization header and provided to an authentication service for authentication.

In 1510, if the authentication service indicates that the credential information provided does not indicate that the entity should be allowed access to the repository, the system performing the process 1500 may proceed to 1512, whereupon access to the repository by the requesting entity is denied. This denial may be in the form of an error message, an interface allowing the entity to try again, an interface allowing the entity to retrieve a forgotten username/password, or some other appropriate response. In some implementations, successful and failed attempts to access the repository are logged.

However, in 1514, if the authentication service indicates that the credential information does indicate that the entity should be allowed access to the repository, the system performing the process 1500 may proceed to 1514, whereupon an authorization token encoding or otherwise indicating that the requesting entity has permission to access the specified repository, may be generated. The authorization token may be a string of characters generated by encrypting, such that the token may be decrypted by the key held by a container registry proxy or container registry front-end service, credentials and/or proof of credentials (e.g., a cryptographic hash of credentials) of an entity authorized to make the request and/or a digital signature usable at least in part at least for certain amount of time (e.g., the token may have been generated at least in part using time-based parameters such that the token has an effective expiration date, after which the token is no longer considered valid) for validating access to the repository.

An example algorithm for generating a token is shown below:

```
generateToken(sessionToken, key)
{
    // Realm + Repository + Permissions + Session Token
    message = "repo1.us-west-1.com\nrepository=abc/123\naccess=write\n" + sessionToken;
    version = "01";
    signature = HMAC(message, key);
    return sVersion + signature + "." + sessionToken;
}
```

The authorization token may be provided in a response to the requesting entity, whereupon the system performing the process 1500 may return to 1502 to request access to the repository, this time the request including the newly generated authorization token. This newly generated authorization token then should be successfully validated in 1504, thereby granting the requesting entity access to the repository. Note that one or more of the operations performed in 1502-14 may be performed in various orders and combinations, including in parallel.

Figure 16:
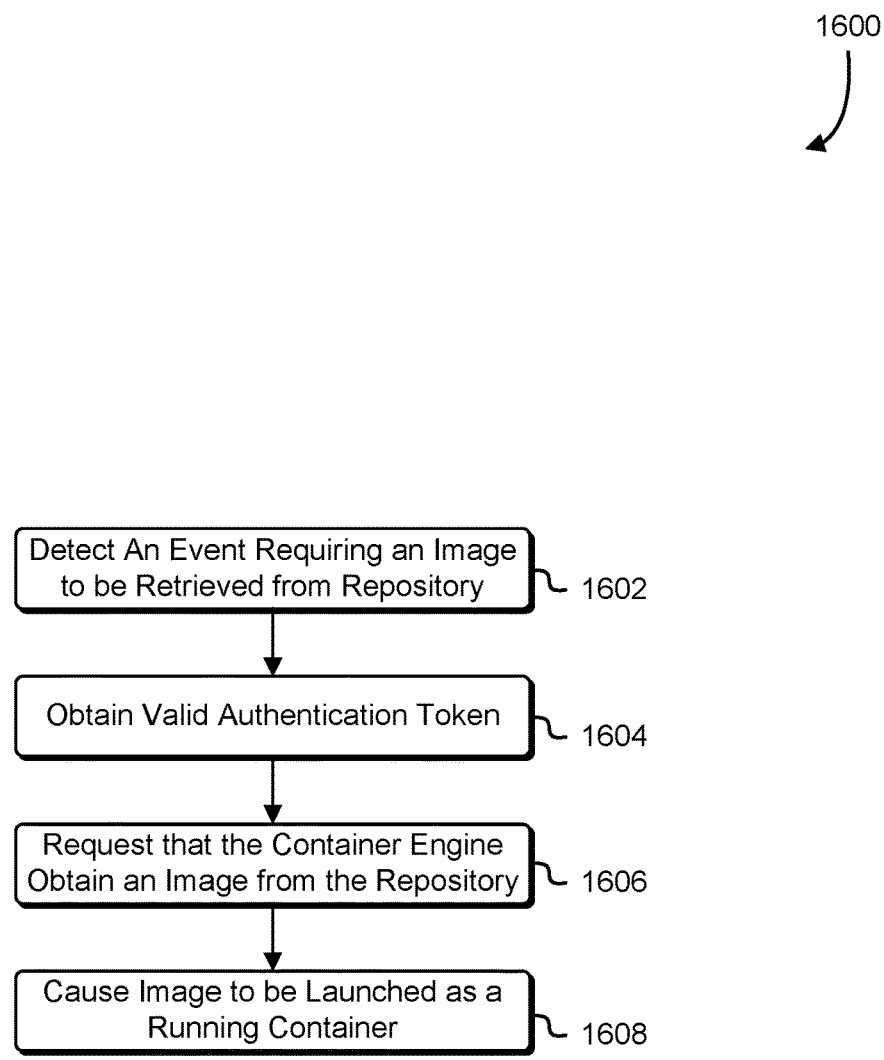
FIG. 16 is a block diagram that illustrates an example of retrieving an image from a repository in accordance with an embodiment.

FIG. 16 is a block diagram illustrating an example of a process 1600 for launching a software container from the perspective of an agent, such as the agent 206 of FIG. 2, in accordance with various embodiments. Some or all of the process 1600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1600 may be performed by any suitable system, such as a server in a data center, by various components of the environment 1700 described in conjunction with FIG. 17, such as the web server 1706 or the application server 1708, by multiple computing devices in a distributed system of a computing resource service provider, or by any electronic client device such as the electronic client device 1702. The process 1600 includes a series of operations wherein the agent detects an event requiring an image to be downloaded from a repository and launched in a current container instance, the agent obtains a valid authentication token permitting access to the repository, obtaining the image from the repository, and launching and running the image in the current container instance.

In 1602, the system performing the process 1600 detects an event requiring obtaining a software image from a repository corresponding to a customer owner of the container instance running on the system. One example of such an event may be receiving a request by a customer through an application programming interface of a container registry front-end service directing the agent to obtain and launch the specified container image. Another example of an event of this kind may be detection by a security sweep or scanning mechanism, such as the security sweep 454 or scanning mechanism 554 of FIGS. 4 and 5 respectively, that the current running version of the software of the container image is noncompliant or contains a vulnerability such that the current running version must be updated or rolled back to a different version of the software of the container image. Still another example of an event of this kind may be that the customer has uploaded a new version of source code of the container image to an automated build service, such as the automated build service 1184 of FIG. 11, and the automated build service communicates to the system performing the process 1600 that the new version should be automatically deployed to replace the current version running in the container instance of the system.

In 1604, the system may obtain a valid authentication token by making a call to a container registry front-end service, such as the container registry front-end service 114 of FIG. 1, such as in the manner described in conjunction with FIG. 9, in order to allow the system to act on behalf of the customer. The authentication token may be valid until it expires. In 1606, having obtained the authentication token, the system may make a request through a container engine, such as the container engine 208 of FIG. 2, to obtain the specified version of the container image, the request including the authentication token. In 1608, as a result of the request being fulfilled and the system obtaining the specified version of the container image, the agent may stop any currently running version of the software of the container image, and launch the obtain diversion of the software of the container image as a running software container in the current container instance. Note that one or more of the operations performed in 1602-08 may be performed in various orders and combinations, including in parallel.

Note too that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 17 illustrates aspects of an example environment 1700 for implementing aspects in accordance with various embodiments. As will be appreciated, although a web-based environment is used for purposes of explanation, different environments may be used, as appropriate, to implement various embodiments. The environment includes an electronic client device 1702, which can include any appropriate device operable to send and/or receive requests, messages or information over an appropriate network 1704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 1704 can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network 1704 can be enabled by wired or wireless connections and combinations thereof. In this example, the network 1704 includes the Internet, as the environment includes a web server 1706 for receiving requests and serving content in response thereto, although for other networks an alternative device serving a similar purpose could be used as would be apparent to one of ordinary skill in the art.

The illustrative environment includes an application server 1708 and a data store 1710. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 1708 can include any appropriate hardware, software and firmware for integrating with the data store 1710 as needed to execute aspects of one or more applications for the electronic client device 1702, handling some or all of the data access and business logic for an application. The application server 1708 may provide access control services in cooperation with the data store 1710 and is able to generate content including, text, graphics, audio, video and/or other content usable to be provided to the user, which may be served to the user by the web server 1706 in the form of HyperText Markup Language ("HTML"), Extensible Markup Language ("XML"), JavaScript, Cascading Style Sheets ("CSS"), or another appropriate client-side structured language. Content transferred to a client device may be processed by the electronic client device 1702 to provide the content in one or more forms including, forms that are perceptible to the user audibly, visually and/or through other senses. The handling of all requests and responses, as well as the delivery of content between the electronic client device 1702 and the application server 1708, can be handled by the web server 1706 using PHP: Hypertext Preprocessor ("PHP"), Python, Ruby, Perl, Java, HTML, XML, or another appropriate server-side structured language in this example. Further, operations described as being performed by a single device may, unless otherwise clear from context, be performed collectively by multiple devices, which may form a distributed and/or virtual system.

The data store 1710 can include several separate data tables, databases, data documents, dynamic data storage schemes and/or other data storage mechanisms and media for storing data relating to a particular aspect of the present disclosure. For example, the data store 1710 may include mechanisms for storing production data 1712 and user information 1716, which can be used to serve content for the production side. The data store 1710 also is shown to include a mechanism for storing log data 1714, which can be used for reporting, analysis or other purposes. It should be understood that there can be many other aspects that may need to be stored in the data store 1710, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update or otherwise process data in response thereto. The application server 1708 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server 1708. In one example, a user, through a device operated by the user, might submit a search request for a certain type of item. In this case, the data store 1710 might access the user information 1716 to verify the identity of the user and can access the catalog detail information to obtain information about items of that type. The information then can be returned to the user, such as in a results listing on a web page that the user is able to view via a browser on the electronic client device 1702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, as a result of execution by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the example environment 1700 in FIG. 17 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network 1704 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 1704. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. Further, in some examples, computer systems are configured to implement one or more services that collectively perform operations of processes described herein. Such computer systems may be configured, for instance, with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. One or more non-transitory computer-readable storage media having collectively stored thereon executable instructions that, as a result of execution by one or more processors of a distributed computer system, cause the distributed computer system to at least:
   receive a request to store, in first data store associated with a customer of a computing resource service provider, a software image, the request including a set of layers of the software image to be stored; and
   as a result of successful authentication of the request:
      determine, based at least in part on first metadata obtained from a second data store:
         a first subset of the set of layers that has not previously been stored in the first data store; and
         a second subset of the set of layers that is currently stored in the first data store;
      store the first subset of layers in the first data store;
      store, in the second data store, second metadata about the first subset of layers stored in the first data store; and
      cause the software image to be launched in a software container of an instance based at least in part on the first subset, the second subset, the first metadata and the second metadata.

2. The one or more non-transitory computer-readable storage media of claim 1, wherein:
   the request includes at least one build artifact for the software image; and
   the executable instructions that cause the distributed computer system to receive the request include instructions that cause the distributed computer system to:
      store at least the one build artifact with a managed source control service; and
      building the set of layers of the software image from at least the one build artifact.

3. The one or more non-transitory computer-readable storage media of claim 1, wherein:
the first data store is located in a first region;
the instance is hosted on a computing system that is physically located in a second region; and
the executable instructions that cause the distributed computer system to cause the software image to be launched further include executable instructions that cause the distributed computer system to:
determine that the instance is running a previous version of the software image;
determine that the software image is a latest version of the software image;
copy the first subset of layers from the first data store to a second data store that is hosted on a computing system that is physically located in the second region to form a copied software image; and
cause the software image to be launched in the software container based at least in part on the copied software image.

4. The one or more non-transitory computer-readable storage media of claim 1, wherein:
the instance is an instance of a second customer of the computing resource service provider; and
the second customer is charged, by the customer, for usage of the software container in which the software image is launched.

5. The one or more non-transitory computer-readable storage media of claim 1, wherein the executable instructions further include executable instructions that cause the distributed computer system to, dependent upon a determination that the software image was successfully launched in the software container of the instance, cause the software image to be launched in a second software container of a second instance associated with the customer.

6. The one or more non-transitory computer-readable storage media of claim 1, wherein:
the first data store holds a first version of a software application associated with a tag;
the software image is a second version of a software application; and
the executable instructions further include executable instructions that cause the distributed computer system to, as a result of receiving a second request to associate the tag with the second version of the software image:
disassociate the tag with the first version; and
associate the tag with the second version.

7. The one or more non-transitory computer-readable storage media of claim 1, wherein the executable instructions that cause the distributed computer system to store the first subset of layers include executable instructions that cause the distributed computer system to:
scan the first subset of layers for a match to one or more specified criteria; and
store, depending at least in part on not finding the match to the one or more specified criteria, the first subset of layers in the first data store.

8. The one or more non-transitory computer-readable storage media of claim 7, wherein the executable instructions that cause the distributed computer system to cause the software image to be launched include executable instructions that cause the distributed computer system to:
obtain the software image from the first data store to form an obtained software image;
open the obtained software image to form an opened software image;
scan the opened software image for a match to one or more specified criteria; and
launch, depending at least in part on not finding a match to the one or more specified criteria, the opened software image in the software container of the instance.

9. A system comprising:
one or more processors; and
memory including executable instructions that, if executed by the one or more processors, cause the system to:
receive a request to store, in first data store associated with a customer of a computing resource service provider, a software image, the request including a set of layers of the software image to be stored; and
as a result of successful authentication of the request:
determine, based at least in part on first metadata obtained from a second data store that:
a first subset of the set of layers has not previously been stored in the first data store; and
a second subset of the set of layers is already stored in the first data store;
store the first subset of layers in the first data store;
store, in the second data store, second metadata about the first subset of layers stored in the first data store; and
cause the software image to be launched in a software container of an instance based at least in part on the first subset, the second subset, the first metadata and the second metadata.

10. The system of claim 9, wherein the executable instructions that cause the software image to be launched include instructions that cause the system to:
obtain the first subset of layers from the first data store as an obtained image; and
deploy the obtained image as a software container within a virtual machine instance associated with the customer.

11. The system of claim 10, wherein
the executable instructions further include instructions that cause the system to obtain, based at least in part on a storage locations in the second metadata, the first subset of layers as an obtained container image; and
the executable instructions that cause the system to deploy the obtained container image further include instructions that cause the system to:
copy the obtained image to a second data store that is physically located in a different geographic region from the first data store to form a copied image; and
deploy, from the second data store, the copied image as another software container to another virtual machine associated with the customer that is physically located in the different geographic region.

12. The system of claim 9, wherein:
the executable instructions further include instructions that cause the system to:
submit credential information of the customer to an authentication service for validation; and
as a result of receiving an indication of successful validation of the credential information by the authentication service, obtain an encrypted security token generated based at least in part on encrypting the credential information and at least one restriction; and
authenticate the request by causing the system to:
decrypt the encrypted security token to obtain decrypted credential information and a decrypted restriction; and verify that the decrypted credential information and the decrypted restriction authorizes fulfilment of the request to store the first subset of layers in the first data store.

13. A computer-implemented method comprising:

receiving a request to store, in first data store associated with a customer of a computing resource service provider, a software image, the request including a set of layers of the software image to be stored; and as a result of successfully authenticating the request:

determining, based at least in part on first metadata obtained from a second data store that the set of layers comprises a first subset and a second subset, the first subset not having previously been stored in the first data store, the second subset being currently stored in the first data store;

storing the first subset of layers in the first data store;

storing, in the second data store, second metadata about the first subset of layers stored in the first data store; and causing the software image to be launched in a software container of an instance based at least in part on the first subset and the second subset.

14. The computer-implemented method of claim 13, wherein successfully authenticating the request includes successfully authenticating a security token that includes encrypted credential information of the customer, the security token being included with the request.

15. The computer-implemented method of claim 13, wherein the request is received through an application programming interface from a device associated with the customer.

16. The computer-implemented method of claim 13, wherein successfully authenticating the request includes:

decrypting an encrypted token included in the request using a key shared as a secret between an entity associated with the customer and the computing resource service provider to produce a set of credentials and a restriction;

authenticating that the set of credentials is associated with the customer;

determining that the customer is authorized to have the first subset of layers stored in the first data store; and determining, based at least in part on the restriction, that the encrypted token is valid.

17. The computer-implemented method of claim 13, further comprising:

receiving, from the instance, a first application programming interface request corresponding to a first container engine type;

translating the first application programming interface request into a second application programming interface request having a format that corresponds to a second container engine type; and providing the second application programming interface request to a service that processes requests of the format that corresponds to the second container engine type.

18. The computer-implemented method of claim 13, wherein:

the method further comprises converting the software image to another software image comprising another set of layers, the other software image being of a different software container type from the software image; and storing the other set of layers of the other software image in the first data store.

19. The computer-implemented method of claim 13, wherein:

the request includes a build artifact for the software image; and the method further comprises:

storing the build artifact at a managed source control service; and building the set of layers of the software image from the build artifact.

20. The computer-implemented method of claim 19, further comprising, dependent upon successfully building the set of layers, scheduling the launching of the software image to the instance in accordance with a deployment strategy specified by the customer.

* * * * *